(12) United States Patent
Cooper

(10) Patent No.: US 10,465,688 B2
(45) Date of Patent: Nov. 5, 2019

(54) COUPLING AND ROTOR SHAFT FOR MOLTEN METAL DEVICES

(71) Applicant: Paul V. Cooper, Chesterland, OH (US)

(72) Inventor: Paul V. Cooper, Chesterland, OH (US)

(73) Assignee: Molten Metal Equipment Innovations, LLC, Middlefield, OH (US)

( * ) Notice: Subject to any disclaimer, the term of this patent is extended or adjusted under 35 U.S.C. 154(b) by 488 days.

(21) Appl. No.: 14/791,137

(22) Filed: Jul. 2, 2015

(65) Prior Publication Data

US 2016/0053814 A1 Feb. 25, 2016

Related U.S. Application Data

(60) Provisional application No. 62/020,332, filed on Jul. 2, 2014.

(51) Int. Cl.
| | |
|---|---|
| *F04D 29/044* | (2006.01) |
| *F04D 7/06* | (2006.01) |
| *F27D 27/00* | (2010.01) |
| *F27D 3/16* | (2006.01) |
| *F16D 1/02* | (2006.01) |
| *F27D 3/14* | (2006.01) |
| *F27D 17/00* | (2006.01) |

(Continued)

(52) U.S. Cl.
CPC ............. *F04D 7/065* (2013.01); *C22B 7/003* (2013.01); *C22B 9/00* (2013.01); *F04D 29/20* (2013.01); *F16D 1/02* (2013.01); *F16D 1/10* (2013.01); *F27D 3/14* (2013.01); *F27D 3/16* (2013.01); *F27D 17/002* (2013.01); *F27D 27/005* (2013.01); *F27D 99/00* (2013.01); *F16C 3/02* (2013.01); *F16D 2001/102* (2013.01); *F27D 2099/0083* (2013.01); *Y02P 10/212* (2015.11)

(58) Field of Classification Search
CPC .......... F16D 1/02; F27D 27/005; F04D 7/065; F04D 7/06; F04D 13/021; F04D 29/026; F04D 29/044; F04D 29/0405; F04D 29/054
See application file for complete search history.

(56) References Cited

U.S. PATENT DOCUMENTS

| | | |
|---|---|---|
| 35,604 A | 6/1862 | Guild |
| 116,797 A | 7/1871 | Barnhart |

(Continued)

FOREIGN PATENT DOCUMENTS

| | | |
|---|---|---|
| CA | 683469 | 3/1964 |
| CA | 2115929 | 8/1992 |

(Continued)

OTHER PUBLICATIONS

USPTO; Final Office Action dated Jun. 15, 2017 in U.S. Appl. No. 13/841,938.

(Continued)

*Primary Examiner* — Michael P Ferguson
(74) *Attorney, Agent, or Firm* — Snell & Wilmer L.L.P.

(57) ABSTRACT

A coupling has an opening and a protrusion extending downward from the opening. The protrusion has threads that are preferably positioned outside of the opening. A rotor shaft that connects to the coupling has an internal bore with threads that receives and retains the protrusion, such as by a threaded connection between the two, so the protrusion applies driving force to the shaft.

24 Claims, 9 Drawing Sheets

(51) Int. Cl.
*F27D 99/00* (2010.01)
*F04D 29/20* (2006.01)
*C22B 9/00* (2006.01)
*C22B 7/00* (2006.01)
*F16D 1/10* (2006.01)
*F16C 3/02* (2006.01)

(56) References Cited

U.S. PATENT DOCUMENTS

| | | |
|---|---|---|
| 209,219 A | 10/1878 | Bookwalter |
| 251,104 A | 12/1881 | Finch |
| 307,845 A | 11/1884 | Curtis |
| 364,804 A | 6/1887 | Cole |
| 390,319 A | 10/1888 | Thomson |
| 495,760 A | 4/1893 | Seitz |
| 506,572 A | 10/1893 | Wagener |
| 585,188 A | 6/1897 | Davis |
| 757,932 A | 4/1904 | Jones |
| 882,477 A | 3/1908 | Neumann |
| 882,478 A | 3/1908 | Neumann |
| 890,319 A | 6/1908 | Wells |
| 898,499 A | 9/1908 | O'donnell |
| 909,774 A | 1/1909 | Flora |
| 919,194 A | 4/1909 | Livingston |
| 1,037,659 A | 9/1912 | Rembert |
| 1,100,475 A | 6/1914 | Frankaerts |
| 1,170,512 A | 2/1916 | Chapman |
| 1,196,758 A | 9/1916 | Blair |
| 1,304,068 A | 5/1919 | Krogh |
| 1,331,997 A | 2/1920 | Neal |
| 1,185,314 A | 3/1920 | London |
| 1,377,101 A | 5/1921 | Sparling |
| 1,380,798 A | 6/1921 | Hansen et al. |
| 1,439,365 A | 12/1922 | Hazell |
| 1,454,967 A | 5/1923 | Gill |
| 1,470,607 A | 10/1923 | Hazell |
| 1,513,875 A | 11/1924 | Wilke |
| 1,518,501 A | 12/1924 | Gill |
| 1,522,765 A | 1/1925 | Wilke |
| 1,526,851 A | 2/1925 | Hall |
| 1,669,668 A | 5/1928 | Marshall |
| 1,673,594 A | 6/1928 | Schmidt |
| 1,697,202 A | 1/1929 | Nagle |
| 1,717,969 A | 6/1929 | Goodner |
| 1,718,396 A | 6/1929 | Wheeler |
| 1,896,201 A | 2/1933 | Sterner-Rainer |
| 1,988,065 A | 1/1935 | Saborio |
| 2,013,455 A | 9/1935 | Baxter |
| 2,038,221 A | 4/1936 | Kagi |
| 2,075,633 A | 3/1937 | Anderegg |
| 2,090,162 A | 8/1937 | Tighe |
| 2,091,677 A | 8/1937 | Fredericks |
| 2,138,814 A | 12/1938 | Bressler |
| 2,173,377 A | 9/1939 | Schultz, Jr. et al. |
| 2,264,740 A | 12/1941 | Brown |
| 2,280,979 A | 4/1942 | Rocke |
| 2,290,961 A | 7/1942 | Hueuer |
| 2,300,688 A | 11/1942 | Nagle |
| 2,304,849 A | 12/1942 | Ruthman |
| 2,368,962 A | 2/1945 | Blom |
| 2,382,424 A | 8/1945 | Stepanoff |
| 2,423,655 A | 7/1947 | Mars et al. |
| 2,488,447 A | 11/1949 | Tangen et al. |
| 2,493,467 A | 1/1950 | Sunnen |
| 2,515,097 A | 7/1950 | Schryber |
| 2,515,478 A | 7/1950 | Tooley et al. |
| 2,528,208 A | 10/1950 | Bonsack et al. |
| 2,528,210 A | 10/1950 | Stewart |
| 2,543,633 A | 2/1951 | Lamphere |
| 2,566,892 A | 4/1951 | Jacobs |
| 2,625,720 A | 1/1953 | Ross |
| 2,626,086 A | 1/1953 | Forrest |
| 2,676,279 A | 4/1954 | Wilson |
| 2,677,609 A | 4/1954 | Moore et al. |
| 2,698,583 A | 1/1955 | House et al. |
| 2,714,354 A | 8/1955 | Farrand |
| 2,762,095 A | 9/1956 | Pemetzrieder |
| 2,768,587 A | 10/1956 | Corneil |
| 2,775,348 A | 12/1956 | Williams |
| 2,779,574 A | 1/1957 | Schneider |
| 2,787,873 A | 4/1957 | Hadley |
| 2,808,782 A | 10/1957 | Thompson et al. |
| 2,809,107 A | 10/1957 | Russell |
| 2,821,472 A | 1/1958 | Peterson et al. |
| 2,824,520 A | 2/1958 | Bartels |
| 2,832,292 A | 4/1958 | Edwards |
| 2,839,006 A | 6/1958 | Mayo |
| 2,853,019 A | 9/1958 | Thorton |
| 2,865,295 A | 12/1958 | Nikolaus |
| 2,865,618 A | 12/1958 | Abell |
| 2,868,132 A | 1/1959 | Rittershofer |
| 2,901,006 A | 8/1959 | Andrews |
| 2,901,677 A | 8/1959 | Chessman et al. |
| 2,906,632 A | 9/1959 | Nickerson |
| 2,918,876 A | 12/1959 | Howe |
| 2,948,524 A | 8/1960 | Sweeney et al. |
| 2,958,293 A | 11/1960 | Pray, Jr. |
| 2,966,381 A | 12/1960 | Menzel |
| 2,978,885 A | 4/1961 | Davison |
| 2,984,524 A | 5/1961 | Franzen |
| 2,987,885 A | 6/1961 | Hodge |
| 3,010,402 A | 11/1961 | King |
| 3,015,190 A | 1/1962 | Arbeit |
| 3,039,864 A | 6/1962 | Hess |
| 3,044,408 A | 7/1962 | Mellott |
| 3,048,384 A | 8/1962 | Sweeney et al. |
| 3,070,393 A | 12/1962 | Silverberg et al. |
| 3,092,030 A | 6/1963 | Wunder |
| 3,099,870 A | 8/1963 | Seeler |
| 3,128,327 A | 4/1964 | Upton |
| 3,130,678 A | 4/1964 | Chenault |
| 3,130,679 A | 4/1964 | Sence |
| 3,171,357 A | 3/1965 | Egger |
| 3,172,850 A | 3/1965 | Englesberg et al. |
| 3,203,182 A | 8/1965 | Pohl |
| 3,227,547 A | 1/1966 | Szekely |
| 3,244,109 A | 4/1966 | Barske |
| 3,251,676 A | 5/1966 | Johnson |
| 3,255,702 A | 6/1966 | Gehrm |
| 3,258,283 A | 6/1966 | Winberg et al. |
| 3,272,619 A | 9/1966 | Sweeney et al. |
| 3,289,473 A | 12/1966 | Louda |
| 3,291,473 A | 12/1966 | Sweeney et al. |
| 3,368,805 A | 2/1968 | Davey et al. |
| 3,374,943 A | 3/1968 | Cervenka |
| 3,400,923 A | 9/1968 | Howie et al. |
| 3,417,929 A | 12/1968 | Secrest et al. |
| 3,432,336 A | 3/1969 | Langrod |
| 3,459,133 A | 8/1969 | Scheffler |
| 3,459,346 A | 8/1969 | Tinnes |
| 3,477,383 A | 11/1969 | Rawson et al. |
| 3,487,805 A | 1/1970 | Satterthwaite |
| 3,512,762 A | 5/1970 | Umbricht |
| 3,512,788 A | 5/1970 | Kilbane |
| 3,532,445 A | 10/1970 | Scheffler et al. |
| 3,561,885 A | 2/1971 | Lake |
| 3,575,525 A | 4/1971 | Fox et al. |
| 3,581,767 A | 6/1971 | Jackson |
| 3,612,715 A | 10/1971 | Yedidiah |
| 3,618,917 A | 11/1971 | Fredrikson |
| 3,620,716 A | 11/1971 | Hess |
| 3,650,730 A | 3/1972 | Derham et al. |
| 3,689,048 A | 9/1972 | Foulard et al. |
| 3,715,112 A | 2/1973 | Carbonnel |
| 3,732,032 A | 5/1973 | Daneel |
| 3,737,304 A | 6/1973 | Blayden |
| 3,737,305 A | 6/1973 | Blayden et al. |
| 3,743,263 A | 7/1973 | Szekely |
| 3,743,500 A | 7/1973 | Foulard et al. |
| 3,753,690 A | 8/1973 | Emley et al. |
| 3,759,628 A | 9/1973 | Kempf |
| 3,759,635 A | 9/1973 | Carter et al. |
| 3,767,382 A | 10/1973 | Bruno et al. |
| 3,776,660 A | 12/1973 | Anderson et al. |

(56) References Cited

U.S. PATENT DOCUMENTS

| | | |
|---|---|---|
| 3,785,632 A | 1/1974 | Kraemer et al. |
| 3,787,143 A | 1/1974 | Carbonnel et al. |
| 3,799,522 A | 3/1974 | Brant et al. |
| 3,799,523 A | 3/1974 | Seki |
| 3,807,708 A | 4/1974 | Jones |
| 3,814,400 A | 6/1974 | Seki |
| 3,824,028 A | 7/1974 | Zenkner et al. |
| 3,824,042 A | 7/1974 | Barnes et al. |
| 3,836,280 A | 9/1974 | Koch |
| 3,839,019 A | 10/1974 | Bruno et al. |
| 3,844,972 A | 10/1974 | Tully, Jr. et al. |
| 3,871,872 A | 3/1975 | Downing et al. |
| 3,873,073 A | 3/1975 | Baum et al. |
| 3,873,305 A | 3/1975 | Claxton et al. |
| 3,881,039 A | 4/1975 | Baldieri et al. |
| 3,886,992 A | 6/1975 | Maas et al. |
| 3,915,594 A | 10/1975 | Nesseth |
| 3,915,694 A | 10/1975 | Ando |
| 3,935,003 A | 1/1976 | Steinke et al. |
| 3,941,588 A | 3/1976 | Dremann |
| 3,941,589 A | 3/1976 | Norman et al. |
| 3,942,473 A | 3/1976 | Chodash |
| 3,954,134 A | 5/1976 | Maas et al. |
| 3,958,979 A | 5/1976 | Valdo |
| 3,958,981 A | 5/1976 | Forberg et al. |
| 3,961,778 A | 6/1976 | Carbonnel et al. |
| 3,966,456 A | 6/1976 | Ellenbaum et al. |
| 3,967,286 A | 6/1976 | Andersson et al. |
| 3,972,709 A | 8/1976 | Chin et al. |
| 3,973,871 A | 8/1976 | Hance |
| 3,984,234 A | 10/1976 | Claxton et al. |
| 3,985,000 A | 10/1976 | Hartz |
| 3,997,336 A | 12/1976 | van Linden et al. |
| 4,003,560 A | 1/1977 | Carbonnel |
| 4,008,884 A | 2/1977 | Fitzpatrick et al. |
| 4,018,598 A | 4/1977 | Markus |
| 4,043,146 A * | 8/1977 | Stegherr .......... F01D 5/026 403/216 |
| 4,052,199 A | 10/1977 | Mangalick |
| 4,055,390 A | 10/1977 | Young |
| 4,063,849 A | 12/1977 | Modianos |
| 4,068,965 A | 1/1978 | Lichti |
| 4,073,606 A | 2/1978 | Eller |
| 4,091,970 A | 5/1978 | Kimiyama et al. |
| 4,119,141 A | 10/1978 | Thut et al. |
| 4,125,146 A | 11/1978 | Muller |
| 4,126,360 A | 11/1978 | Miller et al. |
| 4,128,415 A | 12/1978 | van Linden et al. |
| 4,144,562 A | 3/1979 | Cooper |
| 4,147,474 A | 4/1979 | Heimdal et al. |
| 4,169,584 A | 10/1979 | Mangalick |
| 4,191,486 A | 3/1980 | Pelton |
| 4,192,011 A | 3/1980 | Cooper et al. |
| 4,213,091 A | 7/1980 | Cooper |
| 4,213,176 A | 7/1980 | Cooper |
| 4,213,742 A | 7/1980 | Henshaw |
| 4,219,882 A | 8/1980 | Cooper et al. |
| 4,242,039 A | 12/1980 | Villard et al. |
| 4,244,423 A | 1/1981 | Thut et al. |
| 4,286,985 A | 9/1981 | van Linden et al. |
| 4,305,214 A | 12/1981 | Hurst |
| 4,322,245 A | 3/1982 | Claxton |
| 4,338,062 A | 7/1982 | Neal |
| 4,347,041 A | 8/1982 | Cooper |
| 4,351,514 A | 9/1982 | Koch |
| 4,355,789 A | 10/1982 | Dolzhenkov et al. |
| 4,356,940 A | 11/1982 | Ansorge |
| 4,360,314 A | 11/1982 | Pennell |
| 4,370,096 A | 1/1983 | Church |
| 4,372,541 A | 2/1983 | Bocourt et al. |
| 4,375,937 A | 3/1983 | Cooper |
| 4,389,159 A | 6/1983 | Sarvanne |
| 4,392,888 A | 7/1983 | Eckert et al. |
| 4,410,299 A | 10/1983 | Shimoyama |
| 4,419,049 A | 12/1983 | Gerboth et al. |
| 4,456,424 A | 6/1984 | Araoka |
| 4,456,974 A | 6/1984 | Cooper |
| 4,470,846 A | 9/1984 | Dube |
| 4,474,315 A | 10/1984 | Gilbert et al. |
| 4,489,475 A | 12/1984 | Struttmann |
| 4,496,393 A | 1/1985 | Lustenberger |
| 4,504,392 A | 3/1985 | Groteke |
| 4,509,979 A | 4/1985 | Bauer |
| 4,537,624 A | 8/1985 | Tenhover et al. |
| 4,537,625 A | 8/1985 | Tenhover et al. |
| 4,556,419 A | 12/1985 | Otsuka et al. |
| 4,557,766 A | 12/1985 | Tenhover et al. |
| 4,586,845 A | 5/1986 | Morris |
| 4,592,700 A | 6/1986 | Toguchi et al. |
| 4,593,597 A | 6/1986 | Albrecht et al. |
| 4,594,052 A | 6/1986 | Niskanen |
| 4,596,510 A | 6/1986 | Arneth et al. |
| 4,598,899 A | 7/1986 | Cooper |
| 4,600,222 A | 7/1986 | Appling |
| 4,607,825 A | 8/1986 | Briolle et al. |
| 4,609,442 A | 9/1986 | Tenhover et al. |
| 4,611,790 A | 9/1986 | Otsuka et al. |
| 4,617,232 A | 10/1986 | Chandler et al. |
| 4,634,105 A | 1/1987 | Withers et al. |
| 4,640,666 A | 2/1987 | Sodergard |
| 4,651,806 A | 3/1987 | Allen et al. |
| 4,655,610 A | 4/1987 | Al-Jaroudi |
| 4,673,434 A | 6/1987 | Withers et al. |
| 4,682,585 A | 7/1987 | Hilterbrandt |
| 4,684,281 A | 8/1987 | Patterson |
| 4,685,822 A | 8/1987 | Pelton |
| 4,696,703 A | 9/1987 | Henderson et al. |
| 4,701,226 A | 10/1987 | Henderson et al. |
| 4,702,768 A | 10/1987 | Areaux et al. |
| 4,714,371 A | 12/1987 | Cuse |
| 4,717,540 A | 1/1988 | McRae et al. |
| 4,739,974 A | 4/1988 | Mordue |
| 4,743,428 A | 5/1988 | McRae et al. |
| 4,747,583 A | 5/1988 | Gordon et al. |
| 4,767,230 A | 8/1988 | Leas, Jr. |
| 4,770,701 A | 9/1988 | Henderson et al. |
| 4,786,230 A | 11/1988 | Thut |
| 4,802,656 A | 2/1989 | Hudault et al. |
| 4,804,168 A | 2/1989 | Otsuka et al. |
| 4,810,314 A | 3/1989 | Henderson et al. |
| 4,834,573 A | 5/1989 | Asano et al. |
| 4,842,227 A | 6/1989 | Harrington et al. |
| 4,844,425 A | 7/1989 | Piras et al. |
| 4,851,296 A | 7/1989 | Tenhover et al. |
| 4,859,413 A | 8/1989 | Harris et al. |
| 4,860,819 A | 8/1989 | Moscoe et al. |
| 4,867,638 A | 9/1989 | Handtmann et al. |
| 4,884,786 A | 12/1989 | Gillespie |
| 4,898,367 A | 2/1990 | Cooper |
| 4,908,060 A | 3/1990 | Duenkelmann |
| 4,911,726 A | 3/1990 | Warkentin |
| 4,923,770 A | 5/1990 | Grasselli et al. |
| 4,930,986 A | 6/1990 | Cooper |
| 4,931,091 A | 6/1990 | Waite et al. |
| 4,940,214 A | 7/1990 | Gillespie |
| 4,940,384 A | 7/1990 | Amra et al. |
| 4,954,167 A | 9/1990 | Cooper |
| 4,973,433 A | 11/1990 | Gilbert et al. |
| 4,986,736 A | 1/1991 | Kajiwara |
| 5,006,232 A | 4/1991 | Lidgitt et al. |
| 5,015,518 A | 5/1991 | Sasaki et al. |
| 5,025,198 A | 6/1991 | Mordue et al. |
| 5,028,211 A | 7/1991 | Mordue et al. |
| 5,029,821 A | 7/1991 | Bar-on et al. |
| 5,049,841 A | 9/1991 | Cooper et al. |
| 5,058,654 A | 10/1991 | Simmons |
| 5,078,572 A | 1/1992 | Amra et al. |
| 5,080,715 A | 1/1992 | Provencher et al. |
| 5,083,753 A | 1/1992 | Soofie |
| 5,088,893 A | 2/1992 | Gilbert et al. |
| 5,092,821 A | 3/1992 | Gilbert et al. |
| 5,098,134 A | 3/1992 | Monckton |
| 5,099,554 A | 3/1992 | Cooper |
| 5,114,312 A | 5/1992 | Stanislao |

(56) References Cited

U.S. PATENT DOCUMENTS

| | | |
|---|---|---|
| 5,126,047 A | 6/1992 | Martin et al. |
| 5,131,632 A | 7/1992 | Olson |
| 5,135,202 A | 8/1992 | Yamashita et al. |
| 5,143,357 A | 9/1992 | Gilbert et al. |
| 5,145,322 A | 9/1992 | Senior, Jr. et al. |
| 5,152,631 A | 10/1992 | Bauer |
| 5,154,652 A | 10/1992 | Ecklesdafer |
| 5,158,440 A | 10/1992 | Cooper et al. |
| 5,162,858 A | 11/1992 | Shoji et al. |
| 5,165,858 A | 11/1992 | Gilbert et al. |
| 5,172,458 A | 12/1992 | Cooper |
| 5,177,304 A | 1/1993 | Nagel |
| 5,191,154 A | 3/1993 | Nagel |
| 5,192,193 A | 3/1993 | Cooper et al. |
| 5,202,100 A | 4/1993 | Nagel et al. |
| 5,203,681 A | 4/1993 | Cooper |
| 5,209,641 A | 5/1993 | Hoglund et al. |
| 5,215,448 A | 6/1993 | Cooper |
| 5,268,020 A | 12/1993 | Claxton |
| 5,286,163 A | 2/1994 | Amra et al. |
| 5,298,233 A | 3/1994 | Nagel |
| 5,301,620 A | 4/1994 | Nagel et al. |
| 5,303,903 A | 4/1994 | Butler et al. |
| 5,308,045 A | 5/1994 | Cooper |
| 5,310,412 A | 5/1994 | Gilbert et al. |
| 5,318,360 A | 6/1994 | Langer et al. |
| 5,322,547 A | 6/1994 | Nagel et al. |
| 5,324,341 A | 6/1994 | Nagel et al. |
| 5,330,328 A | 7/1994 | Cooper |
| 5,354,940 A | 10/1994 | Nagel |
| 5,358,549 A | 10/1994 | Nagel et al. |
| 5,358,697 A | 10/1994 | Nagel |
| 5,364,078 A | 11/1994 | Pelton |
| 5,369,063 A | 11/1994 | Gee et al. |
| 5,383,651 A | 1/1995 | Blasen et al. |
| 5,388,633 A | 2/1995 | Mercer, II et al. |
| 5,395,405 A | 3/1995 | Nagel et al. |
| 5,399,074 A | 3/1995 | Nose et al. |
| 5,407,294 A | 4/1995 | Giannini |
| 5,411,240 A | 5/1995 | Rapp et al. |
| 5,425,410 A | 6/1995 | Reynolds |
| 5,431,551 A | 7/1995 | Aquino et al. |
| 5,435,982 A | 7/1995 | Wilkinson |
| 5,436,210 A | 7/1995 | Wilkinson et al. |
| 5,443,572 A | 8/1995 | Wilkinson et al. |
| 5,454,423 A | 10/1995 | Tsuchida et al. |
| 5,468,280 A | 11/1995 | Areaux |
| 5,470,201 A | 11/1995 | Gilbert et al. |
| 5,484,265 A | 1/1996 | Horvath et al. |
| 5,489,734 A | 2/1996 | Nagel et al. |
| 5,491,279 A | 2/1996 | Robert et al. |
| 5,494,382 A | 2/1996 | Kloppers |
| 5,495,746 A | 3/1996 | Sigworth |
| 5,505,143 A | 4/1996 | Nagel |
| 5,505,435 A | 4/1996 | Laszlo |
| 5,509,791 A | 4/1996 | Turner |
| 5,511,766 A | 4/1996 | Vassillicos |
| 5,520,422 A | 5/1996 | Friedrich |
| 5,537,940 A | 7/1996 | Nagel et al. |
| 5,543,558 A | 8/1996 | Nagel et al. |
| 5,555,822 A | 9/1996 | Loewen et al. |
| 5,558,501 A | 9/1996 | Wang et al. |
| 5,558,505 A | 9/1996 | Mordue et al. |
| 5,571,486 A | 11/1996 | Robert et al. |
| 5,585,532 A | 12/1996 | Nagel |
| 5,586,863 A | 12/1996 | Gilbert et al. |
| 5,591,243 A | 1/1997 | Colussi et al. |
| 5,597,289 A | 1/1997 | Thut |
| 5,613,245 A | 3/1997 | Robert |
| 5,616,167 A | 4/1997 | Eckert |
| 5,622,481 A | 4/1997 | Thut |
| 5,629,464 A | 5/1997 | Bach et al. |
| 5,634,770 A | 6/1997 | Gilbert et al. |
| 5,640,706 A | 6/1997 | Nagel et al. |
| 5,640,707 A | 6/1997 | Nagel et al. |
| 5,640,709 A | 6/1997 | Nagel et al. |
| 5,655,849 A | 8/1997 | McEwen et al. |
| 5,660,614 A | 8/1997 | Waite et al. |
| 5,676,520 A | 10/1997 | Thut |
| 5,678,244 A | 10/1997 | Shaw et al. |
| 5,678,807 A | 10/1997 | Cooper |
| 5,679,132 A | 10/1997 | Rauenzahn et al. |
| 5,685,701 A | 11/1997 | Chandler et al. |
| 5,690,888 A | 11/1997 | Robert |
| 5,695,732 A | 12/1997 | Sparks et al. |
| 5,716,195 A | 2/1998 | Thut |
| 5,717,149 A | 2/1998 | Nagel et al. |
| 5,718,416 A | 2/1998 | Flisakowski et al. |
| 5,735,668 A | 4/1998 | Klien |
| 5,735,935 A | 4/1998 | Areaux |
| 5,741,422 A | 4/1998 | Eichenmiller et al. |
| 5,744,117 A | 4/1998 | Wilikinson et al. |
| 5,745,861 A | 4/1998 | Bell et al. |
| 5,755,847 A | 5/1998 | Quayle |
| 5,772,324 A | 6/1998 | Falk |
| 5,776,420 A | 7/1998 | Nagel |
| 5,785,494 A | 7/1998 | Vild et al. |
| 5,805,067 A | 9/1998 | Bradley et al. |
| 5,810,311 A | 9/1998 | Davison et al. |
| 5,842,832 A | 12/1998 | Thut |
| 5,858,059 A | 1/1999 | Abramovich et al. |
| 5,863,314 A | 1/1999 | Morando |
| 5,864,316 A | 1/1999 | Bradley et al. |
| 5,866,095 A | 2/1999 | McGeever et al. |
| 5,875,385 A | 2/1999 | Stephenson et al. |
| 5,935,528 A | 8/1999 | Stephenson et al. |
| 5,944,496 A | 8/1999 | Cooper |
| 5,947,705 A | 9/1999 | Mordue et al. |
| 5,948,352 A | 9/1999 | Jagt |
| 5,949,369 A | 9/1999 | Bradley et al. |
| 5,951,243 A | 9/1999 | Cooper |
| 5,961,285 A | 10/1999 | Meneice et al. |
| 5,963,580 A | 10/1999 | Eckert |
| 5,992,230 A | 11/1999 | Scarpa et al. |
| 5,993,726 A | 11/1999 | Huang |
| 5,993,728 A | 11/1999 | Vild |
| 5,995,041 A | 11/1999 | Bradley et al. |
| 6,019,576 A | 2/2000 | Thut |
| 6,024,286 A | 2/2000 | Bradley et al. |
| 6,027,685 A | 2/2000 | Cooper |
| 6,036,745 A | 3/2000 | Gilbert et al. |
| 6,074,455 A | 6/2000 | van Linden et al. |
| 6,082,965 A | 7/2000 | Morando |
| 6,093,000 A | 7/2000 | Cooper |
| 6,096,109 A | 8/2000 | Nagel et al. |
| 6,113,154 A | 9/2000 | Thut |
| 6,123,523 A | 9/2000 | Cooper |
| 6,152,691 A | 11/2000 | Thut |
| 6,168,753 B1 | 1/2001 | Morando |
| 6,187,096 B1 | 2/2001 | Thut |
| 6,199,836 B1 | 3/2001 | Rexford et al. |
| 6,217,823 B1 | 4/2001 | Vild et al. |
| 6,231,639 B1 | 5/2001 | Eichenmiller |
| 6,243,366 B1 | 6/2001 | Bradley et al. |
| 6,250,881 B1 | 6/2001 | Mordue et al. |
| 6,254,340 B1 | 7/2001 | Vild et al. |
| 6,270,717 B1 | 8/2001 | Tremblay et al. |
| 6,280,157 B1 | 8/2001 | Cooper |
| 6,293,759 B1 | 9/2001 | Thut |
| 6,303,074 B1 | 10/2001 | Cooper |
| 6,345,964 B1 | 2/2002 | Cooper |
| 6,354,796 B1 | 3/2002 | Morando |
| 6,358,467 B1 | 3/2002 | Mordue |
| 6,364,930 B1 | 4/2002 | Kos |
| 6,371,723 B1 | 4/2002 | Grant et al. |
| 6,398,525 B1 | 6/2002 | Cooper |
| 6,439,860 B1 | 8/2002 | Greer |
| 6,451,247 B1 | 9/2002 | Mordue et al. |
| 6,457,940 B1 | 10/2002 | Lehman |
| 6,457,950 B1 | 10/2002 | Cooper et al. |
| 6,464,458 B2 | 10/2002 | Vild et al. |
| 6,495,948 B1 | 12/2002 | Garrett, III |
| 6,497,559 B1 | 12/2002 | Grant |
| 6,500,228 B1 | 12/2002 | Klingensmith et al. |

(56) References Cited

U.S. PATENT DOCUMENTS

| | | |
|---|---|---|
| 6,503,292 B2 | 1/2003 | Klingensmith et al. |
| 6,524,066 B2 | 2/2003 | Thut |
| 6,533,535 B2 | 3/2003 | Thut |
| 6,551,060 B2 | 4/2003 | Mordue et al. |
| 6,562,286 B1 | 5/2003 | Lehman |
| 6,648,026 B2 | 11/2003 | Look et al. |
| 6,656,415 B2 | 12/2003 | Kos |
| 6,679,936 B2 | 1/2004 | Quackenbush |
| 6,689,310 B1 | 2/2004 | Cooper |
| 6,695,510 B1 | 2/2004 | Look et al. |
| 6,709,234 B2 | 3/2004 | Gilbert et al. |
| 6,716,147 B1 | 4/2004 | Hinkle et al. |
| 6,723,276 B1 | 4/2004 | Cooper |
| 6,805,834 B2 | 10/2004 | Thut |
| 6,843,640 B2 | 1/2005 | Mordue et al. |
| 6,848,497 B2 | 2/2005 | Sale et al. |
| 6,869,271 B2 | 3/2005 | Gilbert et al. |
| 6,869,564 B2 | 3/2005 | Gilbert et al. |
| 6,881,030 B2 | 4/2005 | Thut |
| 6,887,424 B2 | 5/2005 | Ohno et al. |
| 6,887,425 B2 | 5/2005 | Mordue et al. |
| 6,902,696 B2 | 6/2005 | Klingensmith et al. |
| 6,955,489 B2 | 10/2005 | Thut |
| 7,037,462 B2 | 5/2006 | Klingensmith et al. |
| 7,056,322 B2 | 6/2006 | Davison et al. |
| 7,074,361 B2 | 7/2006 | Carolla |
| 7,083,758 B2 | 8/2006 | Tremblay |
| 7,131,482 B2 | 11/2006 | Vincent et al. |
| 7,157,043 B2 | 1/2007 | Neff |
| 7,204,954 B2 | 4/2007 | Mizuno |
| 7,279,128 B2 | 10/2007 | Kennedy et al. |
| 7,326,028 B2 | 2/2008 | Morando |
| 7,402,276 B2 | 7/2008 | Cooper |
| 7,470,392 B2 | 12/2008 | Cooper |
| 7,476,357 B2 | 1/2009 | Thut |
| 7,481,966 B2 | 1/2009 | Mizuno |
| 7,497,988 B2 | 3/2009 | Thut |
| 7,507,365 B2 | 3/2009 | Thut |
| 7,507,367 B2 | 3/2009 | Cooper |
| 7,543,605 B1 | 6/2009 | Morando |
| 7,731,891 B2 | 6/2010 | Cooper |
| 7,771,171 B2 | 8/2010 | Mohr |
| 7,896,617 B1 | 3/2011 | Morando |
| 7,906,068 B2 | 3/2011 | Cooper |
| 8,075,837 B2 | 12/2011 | Cooper |
| 8,110,141 B2 | 2/2012 | Cooper |
| 8,137,023 B2 | 3/2012 | Greer |
| 8,142,145 B2 | 3/2012 | Thut |
| 8,178,037 B2 | 5/2012 | Cooper |
| 8,328,540 B2 | 12/2012 | Wang |
| 8,333,921 B2 | 12/2012 | Thut |
| 8,337,746 B2 | 12/2012 | Cooper |
| 8,366,993 B2 | 2/2013 | Cooper |
| 8,409,495 B2 | 4/2013 | Cooper |
| 8,440,135 B2 | 5/2013 | Cooper |
| 8,444,911 B2 | 5/2013 | Cooper |
| 8,449,814 B2 | 5/2013 | Cooper |
| 8,475,594 B2 | 7/2013 | Bright et al. |
| 8,475,708 B2 | 7/2013 | Cooper |
| 8,480,950 B2 | 7/2013 | Jetten et al. |
| 8,501,084 B2 | 8/2013 | Cooper |
| 8,524,146 B2 | 9/2013 | Cooper |
| 8,529,828 B2 | 9/2013 | Cooper |
| 8,535,603 B2 | 9/2013 | Cooper |
| 8,580,218 B2 | 12/2013 | Turenne et al. |
| 8,613,884 B2 | 12/2013 | Cooper |
| 8,714,914 B2 | 5/2014 | Cooper |
| 8,753,563 B2 | 6/2014 | Cooper |
| 8,840,359 B2 | 9/2014 | Vick et al. |
| 8,899,932 B2 | 12/2014 | Tetkoskie et al. |
| 8,915,830 B2 | 12/2014 | March et al. |
| 8,920,680 B2 | 12/2014 | Mao |
| 9,011,761 B2 | 4/2015 | Cooper |
| 9,017,597 B2 | 4/2015 | Cooper |
| 9,034,244 B2 | 5/2015 | Cooper |
| 9,057,376 B2 | 6/2015 | Thut |
| 9,080,577 B2 | 7/2015 | Cooper |
| 9,108,224 B2 | 8/2015 | Schererz |
| 9,108,244 B2 | 8/2015 | Cooper |
| 9,156,087 B2 | 10/2015 | Cooper |
| 9,193,532 B2 | 11/2015 | March et al. |
| 9,205,490 B2 | 12/2015 | Cooper |
| 9,234,520 B2 | 1/2016 | Morando |
| 9,273,376 B2 | 3/2016 | Lutes et al. |
| 9,328,615 B2 | 5/2016 | Cooper |
| 9,377,028 B2 | 6/2016 | Cooper |
| 9,382,599 B2 | 7/2016 | Cooper |
| 9,383,140 B2 | 7/2016 | Cooper |
| 9,409,232 B2 | 8/2016 | Cooper |
| 9,410,744 B2 | 8/2016 | Cooper |
| 9,422,942 B2 | 8/2016 | Cooper |
| 9,435,343 B2 | 9/2016 | Cooper |
| 9,464,636 B2 | 10/2016 | Cooper |
| 9,470,239 B2 | 10/2016 | Cooper |
| 9,476,644 B2 | 10/2016 | Howitt et al. |
| 9,481,035 B2 | 11/2016 | Cooper |
| 9,481,918 B2 | 11/2016 | Vild et al. |
| 9,482,469 B2 | 11/2016 | Cooper |
| 9,506,129 B2 | 11/2016 | Cooper |
| 9,506,346 B2 | 11/2016 | Bright et al. |
| 9,566,645 B2 | 2/2017 | Cooper |
| 9,581,388 B2 | 2/2017 | Cooper |
| 9,587,883 B2 | 3/2017 | Cooper |
| 9,657,578 B2 | 5/2017 | Cooper |
| 9,855,600 B2 | 1/2018 | Cooper |
| 9,862,026 B2 | 1/2018 | Cooper |
| 9,903,383 B2 | 2/2018 | Cooper |
| 9,909,808 B2 | 3/2018 | Cooper |
| 9,925,587 B2 | 3/2018 | Cooper |
| 9,951,777 B2 | 4/2018 | Morando et al. |
| 9,970,442 B2 | 5/2018 | Tipton |
| 9,982,945 B2 | 5/2018 | Cooper |
| 10,052,688 B2 | 8/2018 | Cooper |
| 10,072,897 B2 | 9/2018 | Cooper |
| 10,126,058 B2 | 11/2018 | Cooper |
| 10,126,059 B2 | 11/2018 | Cooper |
| 10,195,664 B2 | 2/2019 | Cooper et al. |
| 10,267,314 B2 | 4/2019 | Cooper |
| 10,274,256 B2 | 4/2019 | Cooper |
| 2001/0000465 A1 | 4/2001 | Thut |
| 2002/0089099 A1 | 7/2002 | Denning |
| 2002/0146313 A1 | 10/2002 | Thut |
| 2002/0185790 A1 | 12/2002 | Klingensmith |
| 2002/0185794 A1 | 12/2002 | Vincent |
| 2003/0047850 A1 | 3/2003 | Areaux |
| 2003/0075844 A1 | 4/2003 | Mordue et al. |
| 2003/0082052 A1 | 5/2003 | Gilbert et al. |
| 2003/0151176 A1 | 8/2003 | Ohno |
| 2003/0201583 A1 | 10/2003 | Killingsmith |
| 2004/0050525 A1 | 3/2004 | Kennedy et al. |
| 2004/0076533 A1 | 4/2004 | Cooper |
| 2004/0115079 A1 | 6/2004 | Cooper |
| 2004/0262825 A1 | 12/2004 | Cooper |
| 2005/0013713 A1 | 1/2005 | Cooper |
| 2005/0013714 A1 | 1/2005 | Cooper |
| 2005/0053499 A1 | 3/2005 | Cooper |
| 2005/0077730 A1 | 4/2005 | Thut |
| 2005/0116398 A1 | 6/2005 | Tremblay |
| 2006/0180963 A1 | 8/2006 | Thut |
| 2007/0253807 A1 | 11/2007 | Cooper |
| 2008/0202644 A1 | 8/2008 | Grassi |
| 2008/0211147 A1 | 9/2008 | Cooper |
| 2008/0213111 A1 | 9/2008 | Cooper |
| 2008/0230966 A1 | 9/2008 | Cooper |
| 2008/0253905 A1 | 10/2008 | Morando et al. |
| 2008/0304970 A1 | 12/2008 | Cooper |
| 2008/0314548 A1 | 12/2008 | Cooper |
| 2009/0054167 A1 | 2/2009 | Cooper |
| 2009/0269191 A1 | 10/2009 | Cooper |
| 2010/0104415 A1 | 4/2010 | Morando |
| 2010/0200354 A1 | 8/2010 | Yagi et al. |
| 2011/0133374 A1 | 6/2011 | Cooper |
| 2011/0140319 A1 | 6/2011 | Cooper |
| 2011/0142603 A1 | 6/2011 | Cooper |

(56) References Cited

U.S. PATENT DOCUMENTS

| | | |
|---|---|---|
| 2011/0142606 A1 | 6/2011 | Cooper |
| 2011/0148012 A1 | 6/2011 | Cooper |
| 2011/0163486 A1 | 7/2011 | Cooper |
| 2011/0210232 A1 | 9/2011 | Cooper |
| 2011/0220771 A1 | 9/2011 | Cooper |
| 2011/0303706 A1 | 12/2011 | Cooper |
| 2012/0003099 A1 | 1/2012 | Tetkoskie |
| 2012/0163959 A1 | 6/2012 | Morando |
| 2013/0105102 A1 | 5/2013 | Cooper |
| 2013/0142625 A1 | 6/2013 | Cooper |
| 2013/0214014 A1 | 8/2013 | Cooper |
| 2013/0224038 A1 | 8/2013 | Tetkoskie |
| 2013/0292426 A1 | 11/2013 | Cooper |
| 2013/0292427 A1 | 11/2013 | Cooper |
| 2013/0299524 A1 | 11/2013 | Cooper |
| 2013/0299525 A1 | 11/2013 | Cooper |
| 2013/0306687 A1 | 11/2013 | Cooper |
| 2013/0334744 A1 | 12/2013 | Tremblay |
| 2013/0343904 A1 | 12/2013 | Cooper |
| 2014/0008849 A1 | 1/2014 | Cooper |
| 2014/0041252 A1 | 2/2014 | Vild et al. |
| 2014/0044520 A1 | 2/2014 | Tipton |
| 2014/0083253 A1 | 3/2014 | Lutes et al. |
| 2014/0210144 A1 | 7/2014 | Torres et al. |
| 2014/0232048 A1 | 8/2014 | Howitt et al. |
| 2014/0252701 A1 | 9/2014 | Cooper |
| 2014/0261800 A1 | 9/2014 | Cooper |
| 2014/0265068 A1 | 9/2014 | Cooper |
| 2014/0271219 A1 | 9/2014 | Cooper |
| 2014/0363309 A1 | 12/2014 | Henderson et al. |
| 2015/0069679 A1 | 3/2015 | Henderson et al. |
| 2015/0192364 A1 | 7/2015 | Cooper |
| 2015/0217369 A1 | 8/2015 | Cooper |
| 2015/0219111 A1 | 8/2015 | Cooper |
| 2015/0219112 A1 | 8/2015 | Cooper |
| 2015/0219113 A1 | 8/2015 | Cooper |
| 2015/0219114 A1 | 8/2015 | Cooper |
| 2015/0224574 A1 | 8/2015 | Cooper |
| 2015/0285557 A1 | 10/2015 | Cooper |
| 2015/0285558 A1 | 10/2015 | Cooper |
| 2015/0323256 A1 | 11/2015 | Cooper |
| 2015/0328682 A1 | 11/2015 | Cooper |
| 2015/0328683 A1 | 11/2015 | Cooper |
| 2016/0031007 A1 | 2/2016 | Cooper |
| 2016/0040265 A1 | 2/2016 | Cooper |
| 2016/0047602 A1 | 2/2016 | Cooper |
| 2016/0053762 A1 | 2/2016 | Cooper |
| 2016/0082507 A1 | 3/2016 | Cooper |
| 2016/0089718 A1 | 3/2016 | Cooper |
| 2016/0091251 A1 | 3/2016 | Cooper |
| 2016/0116216 A1 | 4/2016 | Schlicht et al. |
| 2016/0221855 A1 | 8/2016 | Retorick et al. |
| 2016/0250686 A1 | 9/2016 | Cooper |
| 2016/0265535 A1 | 9/2016 | Cooper |
| 2016/0305711 A1 | 10/2016 | Cooper |
| 2016/0320129 A1 | 11/2016 | Cooper |
| 2016/0320130 A1 | 11/2016 | Cooper |
| 2016/0320131 A1 | 11/2016 | Cooper |
| 2016/0346836 A1 | 12/2016 | Henderson et al. |
| 2016/0348973 A1 | 12/2016 | Cooper |
| 2016/0348974 A1 | 12/2016 | Cooper |
| 2016/0348975 A1 | 12/2016 | Cooper |
| 2017/0037852 A1 | 2/2017 | Bright et al. |
| 2017/0038146 A1 | 2/2017 | Cooper |
| 2017/0045298 A1 | 2/2017 | Cooper |
| 2017/0056973 A1 | 3/2017 | Tremblay et al. |
| 2017/0082368 A1 | 3/2017 | Cooper |
| 2017/0106435 A1 | 4/2017 | Vincent |
| 2017/0167793 A1 | 6/2017 | Cooper et al. |
| 2017/0198721 A1 | 7/2017 | Cooper |
| 2017/0219289 A1 | 8/2017 | Williams et al. |
| 2017/0241713 A1 | 8/2017 | Henderson et al. |
| 2017/0246681 A1 | 8/2017 | Tipton et al. |
| 2017/0276430 A1 | 9/2017 | Cooper |
| 2018/0058465 A1 | 3/2018 | Cooper |
| 2018/0111189 A1 | 4/2018 | Cooper |
| 2018/0178281 A1 | 6/2018 | Cooper |
| 2018/0195513 A1 | 7/2018 | Cooper |
| 2018/0311726 A1 | 11/2018 | Cooper |
| 2019/0032675 A1 | 1/2019 | Cooper |

FOREIGN PATENT DOCUMENTS

| | | |
|---|---|---|
| CA | 2244251 | 12/1996 |
| CA | 2305865 | 2/2000 |
| CA | 2176475 | 7/2005 |
| CA | 2924572 | 4/2015 |
| CH | 392268 | 9/1965 |
| DE | 1800446 | 12/1969 |
| EP | 168250 | 1/1986 |
| EP | 665378 | 2/1995 |
| EP | 1019635 | 6/2006 |
| GB | 543607 | 3/1942 |
| GB | 942648 | 11/1963 |
| GB | 1185314 | 3/1970 |
| GB | 2217784 | 3/1989 |
| JP | 58048796 | 3/1983 |
| JP | 63104773 | 5/1988 |
| JP | 5112837 | 5/1993 |
| JP | 11-270799 | 10/1999 |
| MX | 227385 | 4/2005 |
| NO | 90756 | 1/1959 |
| RU | 416401 | 2/1974 |
| RU | 773312 | 10/1980 |
| WO | 199808990 | 3/1998 |
| WO | 199825031 | 6/1998 |
| WO | 200009889 | 2/2000 |
| WO | 2002012147 | 2/2002 |
| WO | 2004029307 | 4/2004 |
| WO | 2010147932 | 12/2010 |
| WO | 2014055082 | 4/2014 |
| WO | 2014150503 | 9/2014 |
| WO | 2014185971 | 11/2014 |

OTHER PUBLICATIONS

USPTO; Office Action dated Aug. 1, 2017 in U.S. Appl. No. 14/811,655.

"Response to Final Office Action and Request for Continued Examination for U.S. Appl. No. 09/275,627," Including Declarations of Haynes and Johnson, Apr. 16, 2001.

Document No. 504217: Excerpts from "Pyrotek Inc.'s Motion for Summary Judgment of Invalidity and Unenforceability of U.S. Pat. No. 7,402,276," Oct. 2, 2009.

Document No. 505026: Excerpts from "MMEI's Response to Pyrotek's Motion for Summary Judgment of Invalidity or Enforceability of U.S. Pat. No. 7,402,276," Oct. 9, 2009.

Document No. 507689: Excerpts from "MMEI's Pre-Hearing Brief and Supplemental Motion for Summary Judgement of Infringement of Claims 3-4, 15, 17-20, 26 and 28-29 of the '074 Patent and Motion for Reconsideration of the Validity of Claims 7-9 of the '276 Patent," Nov. 4, 2009.

Document No. 517158: Excerpts from "Reasoned Award," Feb. 19, 2010.

Document No. 525055: Excerpts from "Molten Metal Equipment Innovations, Inc.'s Reply Brief in Support of Application to Confirm Arbitration Award and Opposition to Motion to Vacate," May 12, 2010.

USPTO; Notice of Reissue Examination Certificate dated Aug. 27, 2001 in U.S. Appl. No. 90/005,910.

USPTO; Office Action dated Feb. 23, 1996 in U.S. Appl. No. 08/439,739.

USPTO; Office Action dated Aug. 15, 1996 in U.S. Appl. No. 08/439,739.

USPTO; Advisory Action dated Nov. 18, 1996 in U.S. Appl. No. 08/439,739.

USPTO; Advisory Action dated Dec. 9, 1996 in U.S. Appl. No. 08/439,739.

USPTO; Notice of Allowance dated Jan. 17, 1997 in U.S. Appl. No. 08/439,739.

(56) References Cited

OTHER PUBLICATIONS

USPTO; Office Action dated Jul. 22, 1996 in U.S. Appl. No. 08/489,962.
USPTO; Office Action dated Jan. 6, 1997 in U.S. Appl. No. 08/489,962.
USPTO; Interview Summary dated Mar. 4, 1997 in U.S. Appl. No. 08/489,962.
USPTO; Notice of Allowance dated Mar. 27, 1997 in U.S. Appl. No. 08/489,962.
USPTO; Office Action dated Sep. 23, 1998 in U.S. Appl. No. 08/759,780.
USPTO; Interview Summary dated Dec. 30, 1998 in U.S. Appl. No. 08/789,780.
USPTO; Notice of Allowance dated Mar. 17, 1999 in U.S. Appl. No. 08/789,780.
USPTO; Office Action dated Jul. 23, 1998 in U.S. Appl. No. 08/889,882.
USPTO; Office Action dated Jan. 21, 1999 in U.S. Appl. No. 08/889,882.
USPTO; Notice of Allowance dated Mar. 17, 1999 in U.S. Appl. No. 08/889,882.
USPTO; Office Action dated Feb. 26, 1999 in U.S. Appl. No. 08/951,007.
USPTO; Interview Summary dated Mar. 15, 1999 in U.S. Appl. No. 08/951,007.
USPTO; Office Action dated May 17, 1999 in U.S. Appl. No. 08/951,007.
USPTO; Notice of Allowance dated Aug. 27, 1999 in U.S. Appl. No. 08/951,007.
USPTO; Office Action dated Dec. 23, 1999 in U.S. Appl. No. 09/132,934.
USPTO; Notice of Allowance dated Mar. 9, 2000 in U.S. Appl. No. 09/132,934.
USPTO; Office Action dated Jan. 7, 2000 in U.S. Appl. No. 09/152,168.
USPTO; Notice of Allowance dated Aug. 7, 2000 in U.S. Appl. No. 09/152,168.
USPTO; Office Action dated Sep. 29, 1999 in U.S. Appl. No. 09/275,627.
USPTO; Office Action dated May 22, 2000 in U.S. Appl. No. 09/275,627.
USPTO; Office Action dated Nov. 14, 2000 in U.S. Appl. No. 09/275,627.
USPTO; Office Action dated May 21, 2001 in U.S. Appl. No. 09/275,627.
USPTO; Notice of Allowance dated Aug. 31, 2001 in U.S. Appl. No. 09/275,627.
USPTO; Office Action dated Jun. 15, 2000 in U.S. Appl. No. 09/312,361.
USPTO; Notice of Allowance dated Jan. 29, 2001 in U.S. Appl. No. 09/312,361.
USPTO; Office Action dated Jun. 22, 2001 in U.S. Appl. No. 09/569,461.
USPTO; Office Action dated Oct. 12, 2001 in U.S. Appl. No. 09/569,461.
USPTO; Office Action dated May 3, 2002 in U.S. Appl. No. 09/569,461.
USPTO; Advisory Action dated May 14, 2002 in U.S. Appl. No. 09/569,461.
USPTO; Office Action dated Dec. 4, 2002 in U.S. Appl. No. 09/569,461.
USPTO; Interview Summary dated Jan. 14, 2003 in U.S. Appl. No. 09/569,461.
USPTO; Notice of Allowance dated Jun. 24, 2003 in U.S. Appl. No. 09/569,461.
USPTO; Office Action dated Nov. 21, 2000 in U.S. Appl. No. 09/590,108.
USPTO; Office Action dated May 22, 2001 in U.S. Appl. No. 09/590,108.
USPTO; Notice of Allowance dated Sep. 10, 2001 in U.S. Appl. No. 09/590,108.
USPTO; Office Action dated Jan. 30, 2002 in U.S. Appl. No. 09/649,190.
USPTO; Office Action dated Oct. 4, 2002 in U.S. Appl. No. 09/649,190.
USPTO; Office Action dated Apr. 18, 2003 in U.S. Appl. No. 09/649,190.
USPTO; Notice of Allowance dated Nov. 21, 2003 in U.S. Appl. No. 09/649,190.
USPTO; Office Action dated Jun. 7, 2006 in U.S. Appl. No. 10/619,405.
USPTO; Final Office Action dated Feb. 20, 2007 in U.S. Appl. No. 10/619,405.
USPTO; Office Action dated Oct. 9, 2007 in U.S. Appl. No. 10/619,405.
USPTO; Final Office Action dated May 29, 2008 in U.S. Appl. No. 10/619,405.
USPTO; Interview Summary dated Aug. 22, 2008 in U.S. Appl. No. 10/619,405.
USPTO; Ex Parte Quayle dated Sep. 12, 2008 in U.S. Appl. No. 10/619,405.
USPTO; Interview Summary dated Oct. 16, 2008 in U.S. Appl. No. 10/619,405.
USPTO; Notice of Allowance dated Nov. 14, 2008 in U.S. Appl. No. 10/619,405.
USPTO; Office Action dated Mar. 20, 2006 in U.S. Appl. No. 10/620,318.
USPTO; Office Action dated Nov. 16, 2006 in U.S. Appl. No. 10/620,318.
USPTO; Final Office Action dated Jul. 25, 2007 in U.S. Appl. No. 10/620,318.
USPTO; Office Action dated Feb. 12, 2008 in U.S. Appl. No. 10/620,318.
USPTO; Final Office Action dated Oct. 16, 2008 in U.S. Appl. No. 10/620,318.
USPTO; Office Action dated Feb. 25, 2009 in U.S. Appl. No. 10/620,318.
USPTO; Final Office Action dated Oct. 8, 2009 in U.S. Appl. No. 10/620,318.
USPTO; Notice of Allowance dated Jan. 26, 2010 in U.S. Appl. No. 10/620,318.
USPTO; Office Action dated Nov. 15, 2007 in U.S. Appl. No. 10/773,101.
USPTO; Office Action dated Jun. 27, 2006 in U.S. Appl. No. 10/773,102.
USPTO; Final Office Action dated Mar. 6, 2007 in U.S. Appl. No. 10/773,102.
USPTO; Office Action dated Oct. 11, 2007 in U.S. Appl. No. 10/773,102.
USPTO; Interview Summary dated Mar. 18, 2008 in U.S. Appl. No. 10/773,102.
USPTO; Notice of Allowance dated Apr. 18, 2008 in U.S. Appl. No. 10/773,102.
USPTO; Office Action dated Jul. 24, 2006 in U.S. Appl. No. 10/773,105.
USPTO; Final Office Action dated Jul. 21, 2007 in U.S. Appl. No. 10/773,105.
USPTO; Office Action dated Oct. 9, 2007 in U.S. Appl. No. 10/773,105.
USPTO; Interview Summary dated Jan. 25, 2008 in U.S. Appl. No. 10/773,105.
USPTO; Office Action dated May 19, 2008 in U.S. Appl. No. 10/773,105.
USPTO; Interview Summary dated Jul. 21, 2008 in U.S. Appl. No. 10/773,105.
USPTO; Notice of Allowance dated Sep. 29, 2008 in U.S. Appl. No. 10/773,105.
USPTO; Office Action dated Jan. 31, 2008 in U.S. Appl. No. 10/773,118.
USPTO; Final Office Action dated Aug. 18, 2008 in U.S. Appl. No. 10/773,118.

(56) References Cited

OTHER PUBLICATIONS

USPTO; Interview Summary dated Oct. 16, 2008 in U.S. Appl. No. 10/773,118.
USPTO; Office Action dated Dec. 15, 2008 in U.S. Appl. No. 10/773,118.
USPTO; Final Office Action dated May 1, 2009 in U.S. Appl. No. 10/773,118.
USPTO; Office Action dated Jul. 27, 2009 in U.S. Appl. No. 10/773,118.
USPTO; Final Office Action dated Feb. 2, 2010 in U.S. Appl. No. 10/773,118.
USPTO; Interview Summary dated Jun. 4, 2010 in U.S. Appl. No. 10/773,118.
USPTO; Ex Parte Quayle Action dated Aug. 25, 2010 in U.S. Appl. No. 10/773,118.
USPTO; Notice of Allowance dated Nov. 5, 2010 in U.S. Appl. No. 10/773,118.
USPTO; Office Action dated Mar. 16, 2005 in U.S. Appl. No. 10/827,941.
USPTO; Final Office Action dated Nov. 7, 2005 in U.S. Appl. No. 10/827,941.
USPTO; Office Action dated Jul. 12, 2006 in U.S. Appl. No. 10/827,941.
USPTO; Final Office Action dated Mar. 8, 2007 in U.S. Appl. No. 10/827,941.
USPTO; Office Action dated Oct. 29, 2007 in U.S. Appl. No. 10/827,941.
USPTO; Office Action dated Sep. 26, 2008 in U.S. Appl. No. 11/413,982.
USPTO; Office Action dated Dec. 11, 2009 in U.S. Appl. No. 11/766,617.
USPTO; Office Action dated Mar. 8, 2010 in U.S. Appl. No. 11/766,617.
USPTO; Final Office Action dated Sep. 20, 2010 in U.S. Appl. No. 11/766,617.
USPTO; Office Action dated Mar. 1, 2011 in U.S. Appl. No. 11/766,617.
USPTO; Final Office Action dated Sep. 22, 2011 in U.S. Appl. No. 11/766,617.
USPTO; Office Action dated Jan. 27, 2012 in U.S. Appl. No. 11/766,617.
USPTO; Notice of Allowance dated May 15, 2012 in U.S. Appl. No. 11/766,617.
USPTO; Supplemental Notice of Allowance dated Jul. 31, 2012 in U.S. Appl. No. 11/766,617.
USPTO; Notice of Allowance dated Aug. 24, 2012 in U.S. Appl. No. 11/766,617.
USPTO; Final Office Action dated Oct. 14, 2008 in U.S. Appl. No. 12/111,835.
USPTO; Office Action dated May 15, 2009 in U.S. Appl. No. 12/111,835.
USPTO; Office Action dated Mar. 31, 2009 in U.S. Appl. No. 12/120,190.
USPTO; Final Office Action dated Dec. 4, 2009 in U.S. Appl. No. 12/120,190.
USPTO; Office Action dated Jun. 28, 2010 in U.S. Appl. No. 12/120,190.
USPTO; Final Office Action dated Jan. 6, 2011 in U.S. Appl. No. 12/120,190.
USPTO; Office Action dated Jun. 27, 2011 in U.S. Appl. No. 12/120,190.
USPTO; Final Office Action dated Nov. 28, 2011 in U.S. Appl. No. 12/120,190.
USPTO; Notice of Allowance dated Feb. 6, 2012 in U.S. Appl. No. 12/120,190.
USPTO; Office Action dated Nov. 3, 2008 in U.S. Appl. No. 12/120,200.
USPTO; Final Office Action dated May 28, 2009 in U.S. Appl. No. 12/120,200.
USPTO; Office Action dated Dec. 18, 2009 in U.S. Appl. No. 12/120,200.
USPTO; Final Office Action dated Jul. 9, 2010 in U.S. Appl. No. 12/120,200.
USPTO; Office Action dated Jan. 21, 2011 in U.S. Appl. No. 12/120,200.
USPTO; Final Office Action dated Jul. 26, 2011 in U.S. Appl. No. 12/120,200.
USPTO; Final Office Action dated Feb. 3, 2012 in U.S. Appl. No. 12/120,200.
USPTO; Notice of Allowance dated Jan. 17, 2013 in U.S. Appl. No. 12/120,200.
USPTO; Office Action dated Jun. 16, 2009 in U.S. Appl. No. 12/146,770.
USPTO; Final Office Action dated Feb. 24, 2010 in U.S. Appl. No. 12/146,770.
USPTO; Office Action dated Jun. 9, 2010 in U.S. Appl. No. 12/146,770.
USPTO; Office Action dated Nov. 18, 2010 in U.S. Appl. No. 12/146,770.
USPTO; Final Office Action dated Apr. 4, 2011 in U.S. Appl. No. 12/146,770.
USPTO; Notice of Allowance dated Aug. 22, 2011 in U.S. Appl. No. 12/146,770.
USPTO; Notice of Allowance dated Nov. 1, 2011 in U.S. Appl. No. 12/146,770.
USPTO; Office Action dated Apr. 27, 2009 in U.S. Appl. No. 12/146,788.
USPTO; Final Office Action dated Oct. 15, 2009 in U.S. Appl. No. 12/146,788.
USPTO; Office Action dated Feb. 16, 2010 in U.S. Appl. No. 12/146,788.
USPTO; Final Office Action dated Jul. 13, 2010 in U.S. Appl. No. 12/146,788.
USPTO; Office Action dated Apr. 19, 2011 in U.S. Appl. No. 12/146,788.
USPTO; Notice of Allowance dated Aug. 19, 2011 in U.S. Appl. No. 12/146,788.
USPTO; Office Action dated Apr. 13, 2009 in U.S. Appl. No. 12/264,416.
USPTO; Final Office Action dated Oct. 8, 2009 in U.S. Appl. No. 12/264,416.
USPTO; Office Action dated Feb. 1, 2010 in U.S. Appl. No. 12/264,416.
USPTO; Final Office Action dated Jun. 30, 2010 in U.S. Appl. No. 12/264,416.
USPTO; Office Action dated Mar. 17, 2011 in U.S. Appl. No. 12/264,416.
USPTO; Final Office Action dated Jul. 7, 2011 in U.S. Appl. No. 12/264,416.
USPTO; Office Action dated Nov. 4, 2011 in U.S. Appl. No. 12/264,416.
USPTO; Final Office Action dated Jun. 8, 2012 in U.S. Appl. No. 12/264,416.
USPTO; Office Action dated Nov. 28, 2012 in U.S. Appl. No. 12/264,416.
USPTO; Ex Parte Quayle dated Apr. 3, 2013 in U.S. Appl. No. 12/264,416.
USPTO; Notice of Allowance dated Jun. 23, 2013 in U.S. Appl. No. 12/264,416.
USPTO; Office Action dated May 22, 2009 in U.S. Appl. No. 12/369,362.
USPTO; Final Office Action dated Dec. 14, 2009 in U.S. Appl. No. 12/369,362.
USPTO; Final Office Action dated Jun. 11, 2010 in U.S. Appl. No. 12/395,430.
USPTO; Office Action dated Nov. 24, 2010 in U.S. Appl. No. 12/395,430.
USPTO; Final Office Action dated Apr. 6, 2011 in U.S. Appl. No. 12/395,430.
USPTO; Office Action dated Aug. 18, 2011 in U.S. Appl. No. 12/395,430.

(56) References Cited

OTHER PUBLICATIONS

USPTO; Final Office Action dated Dec. 13, 2011 in U.S. Appl. No. 12/395,430.
USPTO; Advisory Action dated Feb. 22, 2012 in U.S. Appl. No. 12/395,430.
USPTO; Notice of Allowance dated Sep. 20, 2012 in U.S. Appl. No. 12/395,430.
USPTO; Office Action dated Sep. 29, 2010 in U.S. Appl. No. 12/758,509.
USPTO; Final Office Action dated May 11, 2011 in U.S. Appl. No. 12/758,509.
USPTO; Office Action dated Feb. 1, 2012 in U.S. Appl. No. 12/853,201.
USPTO; Final Office Action dated Jul. 3, 2012 in U.S. Appl. No. 12/853,201.
USPTO; Notice of Allowance dated Jan. 31, 2013 in U.S. Appl. No. 12/853,201.
USPTO; Office Action dated Jan. 3, 2013 in U.S. Appl. No. 12/853,238.
USPTO; Office Action dated Dec. 18, 2013 in U.S. Appl. No. 12/853,238.
USPTO; Final Office Action dated Jun. 19, 2014 in U.S. Appl. No. 12/853,238.
USPTO; Office Action dated Mar. 31, 2015 in U.S. Appl. No. 12/853,238.
USPTO; Office Action dated Jan. 20, 2016 in U.S. Appl. No. 12/853,238.
USPTO; Office Action dated Feb. 27, 2012 in U.S. Appl. No. 12/853,253.
USPTO; Ex Parte Quayle Action dated Jun. 27, 2012 in U.S. Appl. No. 12/853,253.
USPTO; Notice of Allowance dated Oct. 2, 2012 in U.S. Appl. No. 12/853,253.
USPTO; Office Action dated Mar. 12, 2012 in U.S. Appl. No. 12/853,255.
USPTO; Final Office Action dated Jul. 24, 2012 in U.S. Appl. No. 12/853,255.
USPTO; Office Action dated Jan. 18, 2013 in U.S. Appl. No. 12/853,255.
USPTO; Notice of Allowance dated Jun. 20, 2013 in U.S. Appl. No. 12/853,255.
USPTO; Office Action dated Apr. 19, 2012 in U.S. Appl. No. 12/853,268.
USPTO; Final Office Action dated Sep. 17, 2012 in U.S. Appl. No. 12/853,268.
USPTO; Notice of Allowance dated Nov. 21, 2012 in U.S. Appl. No. 12/853,268.
USPTO; Office Action dated Aug. 1, 2013 in U.S. Appl. No. 12/877,988.
USPTO; Notice of Allowance dated Dec. 24, 2013 in U.S. Appl. No. 12/877,988.
USPTO; Office Action dated May 29, 2012 in U.S. Appl. No. 12/878,984.
USPTO; Office Action dated Oct. 3, 2012 in U.S. Appl. No. 12/878,984.
USPTO; Final Office Action dated Jan. 25, 2013 in U.S. Appl. No. 12/878,984.
USPTO; Notice of Allowance dated Mar. 28, 2013 in U.S. Appl. No. 12/878,984.
USPTO; Office Action dated Sep. 22, 2011 in U.S. Appl. No. 12/880,027.
USPTO; Final Office Action dated Feb. 16, 2012 in U.S. Appl. No. 12/880,027.
USPTO; Office Action dated Dec. 14, 2012 in U.S. Appl. No. 12/880,027.
USPTO; Final Office Action dated Jul. 11, 2013 in U.S. Appl. No. 12/880,027.
USPTO; Office Action dated Jul. 16, 2014 in U.S. Appl. No. 12/880,027.
USPTO; Ex Parte Quayle Office Action dated Dec. 19, 2014 in U.S. Appl. No. 12/880,027.
USPTO; Notice of Allowance dated Apr. 8, 2015 in U.S. Appl. No. 12/880,027.
USPTO; Office Action dated Dec. 18, 2013 in U.S. Appl. No. 12/895,796.
USPTO; Final Office Action dated Jun. 3, 2014 in U.S. Appl. No. 12/895,796.
USPTO; Office Action dated Nov. 17, 2014 in U.S. Appl. No. 12/895,796.
USPTO; Office Action dated Sep. 1, 2015 in U.S. Appl. No. 12/895,796.
USPTO; Office Action dated Aug. 25, 2011 in U.S. Appl. No. 13/047,719.
USPTO; Final Office Action dated Dec. 16, 2011 in U.S. Appl. No. 13/047,719.
USPTO; Office Action dated Sep. 11, 2012 in U.S. Appl. No. 13/047,719.
USPTO; Notice of Allowance dated Feb. 28, 2013 in U.S. Appl. No. 13/047,719.
USPTO; Office Action dated Aug. 25, 2011 in U.S. Appl. No. 13/047,747.
USPTO; Final Office Action dated Feb. 7, 2012 in U.S. Appl. No. 13/047,747.
USPTO; Notice of Allowance dated Apr. 18, 2012 in U.S. Appl. No. 13/047,747.
USPTO; Office Action dated Dec. 13, 2012 in U.S. Appl. No. 13/047,747.
USPTO; Notice of Allowance dated Apr. 3, 2013 in U.S. Appl. No. 13/047,747.
USPTO; Office Action dated Apr. 12, 2013 in U.S. Appl. No. 13/106,853.
USPTO; Notice of Allowance dated Aug. 23, 2013 in U.S. Appl. No. 13/106,853.
USPTO; Office Action dated Apr. 18, 2012 in U.S. Appl. No. 13/252,145.
USPTO; Final Office Action dated Sep. 17, 2012 in U.S. Appl. No. 13/252,145.
USPTO; Notice of Allowance dated Nov. 30, 2012 in U.S. Appl. No. 13/252,145.
USPTO; Office Action dated Sep. 18, 2013 in U.S. Appl. No. 13/752,312.
USPTO; Final Office Action dated Jan. 27, 2014 in U.S. Appl. No. 13/752,312.
USPTO; Final Office Action dated May 23, 2014 in U.S. Appl. No. 13/752,312.
USPTO; Notice of Allowance dated Dec. 17, 2014 in U.S. Appl. No. 13/752,312.
USPTO; Office Action dated Sep. 6, 2013 in U.S. Appl. No. 13/725,383.
USPTO; Office Action dated Oct. 24, 2013 in U.S. Appl. No. 13/725,383.
USPTO; Office Action dated Mar. 3, 2015 in U.S. Appl. No. 13/725,383.
USPTO; Office Action dated Nov. 20, 2015 in U.S. Appl. No. 13/725,383.
USPTO; Office Action dated Sep. 11, 2013 in U.S. Appl. No. 13/756,468.
USPTO; Notice of Allowance dated Feb. 3, 2014 in U.S. Appl. No. 13/756,468.
USPTO; Office Action dated Sep. 10, 2014 in U.S. Appl. No. 13/791,952.
USPTO; Office Action dated Dec. 15, 2015 in U.S. Appl. No. 13/800,460.
USPTO; Office Action dated Sep. 23, 2014 in U.S. Appl. No. 13/843,947.
USPTO; Office Action dated Nov. 28, 2014 in U.S. Appl. No. 13/843,947.
USPTO; Final Office dated Apr. 10, 2015 in U.S. Appl. No. 13/843,947.
USPTO; Final Office Action dated Sep. 11, 2015 in U.S. Appl. No. 13/843,947.

(56) References Cited

OTHER PUBLICATIONS

USPTO; Ex Parte Quayle Action dated Jan. 25, 2016 in U.S. Appl. No. 13/843,947.
USPTO; Office Action dated Sep. 22, 2014 in U.S. Appl. No. 13/830,031.
USPTO; Notice of Allowance dated Jan. 30, 2015 in U.S. Appl. No. 13/830,031.
USPTO; Office Action dated Sep. 25, 2014 in U.S. Appl. No. 13/838,601.
USPTO; Final Office Action dated Mar. 3, 2015 in U.S. Appl. No. 13/838,601.
USPTO; Office Action dated Jul. 24, 2015 in U.S. Appl. No. 13/838,601.
USPTO; Office Action dated Aug. 14, 2014 in U.S. Appl. No. 13/791,889.
USPTO; Final Office Action dated Dec. 5, 2014 in U.S. Appl. No. 13/791,889.
USPTO; Office Action dated Sep. 15, 2014 in U.S. Appl. No. 13/797,616.
USPTO; Notice of Allowance dated Feb. 4, 2015 in U.S. Appl. No. 13/797,616.
USPTO; Restriction Requirement dated Sep. 17, 2014 in U.S. Appl. No. 13/801,907.
USPTO; Office Action dated Dec. 9, 2014 in U.S. Appl. No. 13/801,907.
USPTO; Notice of Allowance dated Jun. 5, 2015 in U.S. Appl. No. 13/801,907.
USPTO; Supplemental Notice of Allowance dated Oct. 2, 2015 in U.S. Appl. No. 13/801,907.
USPTO; Office Action dated Jan. 9, 2015 in U.S. Appl. No. 13/802,040.
USPTO; Notice of Allowance dated Jul. 14, 2015 in U.S. Appl. No. 13/802,040.
USPTO; Restriction Requirement dated Sep. 17, 2014 in U.S. Appl. No. 13/802,203.
USPTO; Office Action dated Dec. 11, 2014 in U.S. Appl. No. 13/802,203.
USPTO; Office Action dated Jan. 12, 2016 in U.S. Appl. No. 13/802,203.
USPTO; Office Action dated Feb. 13, 2015 in U.S. Appl. No. 13/973,962.
USPTO; Final Office Action dated Jul. 16, 2015 in U.S. Appl. No. 13/973,962.
USPTO; Office Action dated Apr. 10, 2015 in U.S. Appl. No. 14/027,237.
USPTO; Notice of Allowance dated Nov. 24, 2015 in U.S. Appl. No. 13/973,962.
USPTO; Notice of Allowance dated Mar. 8, 2016 in U.S. Appl. No. 13/973,962.
USPTO; Final Office Action dated Aug. 20, 2015 in U.S. Appl. No. 14/027,237.
USPTO; Ex Parte Quayle Action dated Nov. 4, 2015 in U.S. Appl. No. 14/027,237.
USPTO; Notice of Allowance dated Jan. 15, 2016 in U.S. Appl. No. 14/027,237.
USPTO; Restriction Requirement dated Jun. 25, 2015 in U.S. Appl. No. 13/841,938.
USPTO; Office Action dated Aug. 25, 2015 in U.S. Appl. No. 13/841,938.
USPTO; Final Office Action dated Jul. 10, 2015 in U.S. Appl. No. 12/853,238.
USPTO; Final Office Action dated Jul. 10, 2015 in U.S. Appl. No. 13/725,383.
USPTO; Office Action dated Jul. 30, 2015 in U.S. Appl. No. 13/841,594.
USPTO; Office Action dated Dec. 17, 2015 in U.S. Appl. No. 14/286,442.
USPTO; Office Action dated Dec. 23, 2015 in U.S. Appl. No. 14/662,100.
USPTO; Office Action dated Dec. 14, 2015 in U.S. Appl. No. 14/687,806.
USPTO; Office Action dated Dec. 18, 2015 in U.S. Appl. No. 14/689,879.
USPTO; Office Action dated Dec. 15, 2015 in U.S. Appl. No. 14/690,064.
USPTO; Office Action dated Dec. 31, 2015 in U.S. Appl. No. 14/690,099.
USPTO; Office Action dated Jan. 4, 2016 in U.S. Appl. No. 14/712,435.
USPTO; Office Action dated Feb. 11, 2016 in U.S. Appl. No. 14/690,174.
USPTO; Office Action dated Feb. 23, 2016 in U.S. Appl. No. 13/841,594.
USPTO; Office Action dated Feb. 25, 2016 in U.S. Appl. No. 13/841,938.
USPTO; Final Office Action dated Feb. 25, 2016 in U.S. Appl. No. 13/841,938.
USPTO; Office Action dated Mar. 10, 2016 in U.S. Appl. No. 14/690,218.
USPTO; Notice of Allowance dated Mar. 21, 2016 in U.S. Appl. No. 13/843,947.
CIPO; Office Action dated Dec. 4, 2002 in U.S. Pat. No. 2,115,929.
CIPO; Office Action dated Apr. 22, 2002 in U.S. Pat. No. 2,115,929.
CIPO; Notice of Allowance dated Jul. 18, 2003 in U.S. Pat. No. 2,115,929.
CIPO; Office Action dated Jun. 30, 2003 in U.S. Pat. No. 2,176,475.
CIPO; Notice of Allowance dated Sep. 15, 2004 in U.S. Pat. No. 2,176,475.
CIPO; Office Action dated May 29, 2000 in U.S. Pat. No. 2,242,174.
CIPO; Office Action dated Feb. 22, 2006 in U.S. Pat. No. 2,244,251.
CIPO; Office Action dated Mar. 27, 2007 in U.S. Pat. No. 2,244,251.
CIPO; Notice of Allowance dated Jan. 15, 2008 in U.S. Pat. No. 2,244,251.
CIPO; Office Action dated Sep. 18, 2002 in U.S. Pat. No. 2,305,865.
CIPO; Notice of Allowance dated May 2, 2003 in U.S. Pat. No. 2,305,865.
EPO; Examination Report dated Oct. 6, 2008 in Application No. 08158682.
EPO; Office Action dated Jan. 26, 2010 in Application No. 08158682.
EPO; Office Action dated Feb. 15, 2011 in Application No. 08158682.
EPO; Search Report dated Nov. 9, 1998 in Application No. 98112356.
EPO; Office Action dated Feb. 6, 2003 in Application No. 99941032.
EPO; Office Action dated Aug. 20, 2004 in Application No. 99941032.
PCT; International Search Report or Declaration dated Nov. 15, 1999 in Application No. PCT/US1999/18178.
PCT; International Search Report or Declaration dated Oct. 9, 1998 in Application No. PCT/US1999/22440.
USPTO; Final Office Action dated May 2, 2016 in U.S. Appl. No. 14/687,806.
USPTO; Office action dated May 4, 2016 in U.S. Appl. No. 14/923,296.
USPTO; Notice of Allowance dated May 6, 2016 in U.S. Appl. No. 13/725,383.
USPTO; Notice of Allowance dated May 8, 2016 in U.S. Appl. No. 13/802,203.
USPTO; Office Action dated May 9, 2016 in U.S. Appl. No. 14/804,157.
USPTO; Office Action dated May 19, 2016 in U.S. Appl. No. 14/745,845.
USPTO; Office Action dated May 27, 2016 in U.S. Appl. No. 14/918,471.
USPTO; Office Action dated Jun. 6, 2016 in U.S. Appl. No. 14/808,935.
USPTO; Final Office Action dated Jun. 15, 2016 in U.S. Appl. No. 14/689,879.
USPTO; Notice of Allowance dated Jul. 7, 2016 in U.S. Appl. No. 14/804,157.
USPTO; Notice of Allowance dated Jul. 7, 2016 in U.S. Appl. No. 14/690,218.
USPTO; Notice of Allowance dated Jul. 7, 2016 in U.S. Appl. No. 14/690,099.

(56) References Cited

OTHER PUBLICATIONS

USPTO; Notice of Allowance dated Jul. 7, 2016 in U.S. Appl. No. 14/662,100.
USPTO; Notice of Allowance dated Jul. 20, 2016 in U.S. Appl. No. 14/715,435.
USPTO; Final Office Action dated Jul. 28, 2016 in U.S. Appl. No. 13/800,460.
USPTO; Office Action dated Aug. 1, 2016 in U.S. Appl. No. 15/153,735.
USPTO; Office Action dated Aug. 15, 2016 in U.S. Appl. No. 14/811,655.
USPTO; Office Action dated Aug. 17, 2016 in U.S. Appl. No. 14/959,758.
USPTO; Final Office Action dated Aug. 10, 2016 in U.S. Appl. No. 12/853,238.
USPTO; Final Office Action dated Aug. 26, 2016 in U.S. Appl. No. 14/923,296.
USPTO; Office Action dated Aug. 29, 2016 in U.S. Appl. No. 14/687,806.
USPTO; Final Office Action dated Sep. 15, 2016 in U.S. Appl. No. 14/745,845.
USPTO; Office Action dated Sep. 15, 2016 in U.S. Appl. No. 14/746,593.
USPTO; Office Action dated Sep. 22, 2016 in U.S. Appl. No. 13/841,594.
USPTO; Notice of Allowance dated Sep. 28, 2016 in U.S. Appl. No. 14/918,471.
USPTO; Office Action dated Oct. 11, 2016 in U.S. Appl. No. 13/841,938.
USPTO; Office Action dated Oct. 27, 2016 in U.S. Appl. No. 14/689,879.
USPTO; Notice of Allowance dated Nov. 25, 2016 in U.S. Appl. No. 15/153,735.
USPTO; Notice of Allowance dated Nov. 29, 2016 in U.S. Appl. No. 14/808,935.
USPTO; Notice of Allowance dated Dec. 27, 2016 in U.S. Appl. No. 14/687,806.
USPTO; Notice of Allowance dated Dec. 30, 2016 in U.S. Appl. No. 14/923,296.
USPTO; Notice of Allowance dated Mar. 13, 2017 in U.S. Appl. No. 14/923,296.
USPTO; Final Office Action dated Mar. 17, 2017 in U.S. Appl. No. 14/811,655.
USPTO; Office Action dated Mar. 17, 2017 in U.S. Appl. No. 14/880,998.
USPTO; Final Office Action dated Mar. 29, 2017 in U.S. Appl. No. 14/959,758.
USPTO; Final Office Action dated Apr. 3, 2017 in U.S. Appl. No. 14/745,845.
USPTO; Office Action dated Apr. 11, 2017 in U.S. Appl. No. 14/959,811.
USPTO; Office Action dated Apr. 12, 2017 in U.S. Appl. No. 14/746,593.
USPTO; Office Action dated Apr. 20, 2017 in U.S. Appl. No. 14/959,653.
USPTO; Notice of Allowance dated Dec. 6, 2017 in U.S. Appl. No. 14/959,653.
USPTO; Notice of Allowance dated Dec. 8, 2017 in U.S. Appl. No. 14/811,655.
USPTO; Notice of Allowance dated Dec. 12, 2017 in U.S. Appl. No. 14/959,811.
USPTO; Notice of Allowance dated Dec. 20, 2017 in U.S. Appl. No. 13/800,460.
USPTO; Non-Final Office Action dated Jan. 5, 2018 in U.S. Appl. No. 15/013,879.
USPTO; Notice of Allowance dated Jan. 5, 2018 in U.S. Appl. No. 15/194,544.
USPTO; Final Office Action dated Jan. 10, 2018 in U.S. Appl. No. 14/689,879.
USPTO; Final Office Action dated Jan. 17, 2018 in U.S. Appl. No. 14/745,845.
USPTO; Notice of Allowance dated Jan. 22. 2018 in U.S. Appl. No. 13/800,460.
USPTO; Notice of Allowance dated Feb. 8, 2018 in U.S. Appl. No. 15/194,544.
USPTO; Notice of Allowance dated Feb. 14, 2018 in U.S. Appl. No. 14/959,811.
USPTO; Notice of Allowance dated May 22, 2018 in U.S. Appl. No. 15/435,884.
USPTO; Notice of Allowance dated Jun. 5, 2018 in U.S. Appl. No. 13/841,938.
USPTO; Notice of Allowance dated Jun. 15, 2018 in U.S. Appl. No. 13/841,938.
USPTO; Non-Final Office Action dated Jun. 21, 2018 in U.S. Appl. No. 12/853,238.
USPTO; Notice of Allowance dated Jun. 22, 2018 in U.S. Appl. No. 13/841,938.
USPTO, Non-Final Office Action dated Jun. 28, 2018 in U.S. Appl. No. 14/791,166.
USPTO; Non-Final Office Action dated Jun. 28, 2018 in U.S. Appl. No. 15/431,596.
USPTO; Non-Final Office Action dated Jul. 2, 2108 in U.S. Appl. No. 15/619,289.
USPTO; Non-Final Office Action dated Jul. 6, 2018 in U.S. Appl. No. 15/902,444.
USPTO; Non-Final Office Action dated Jul. 11, 2018 in U.S. Appl. No. 15/339,624.
USPTO; Final Office Action dated Jul. 11, 2018 in U.S. Appl. No. 15/013,879.
USPTO; Notice of Allowance dated Jul. 25, 2018 in U.S. Appl. No. 14/689,879.
USPTO; Notice of Allowance dated Jul. 30, 2018 in U.S. Appl. No. 15/205,700.
USPTO; Notice of Allowance dated Aug. 6, 2018 in U.S. Appl. No. 15/233,882.
USPTO; Notice of Allowance dated Aug. 13, 2018 in U.S. Appl. No. 15/233,882.
USPTO; Notice of Allowance dated Aug. 13, 2018 in U.S. Appl. No. 15/233,946.
USPTO; Non-Final Office Action dated Aug. 31, 2018 in U.S. Appl. No. 15/234,490.
USPTO; Non-Final Office Action dated Sep. 11, 2018 in U.S. Appl. No. 15/406,515.
USPTO; Notice of Allowance dated Mar. 12, 2018 in U.S. Appl. No. 15/209,660.
USPTO; Final Office Action dated Mar. 20, 2018 in U.S. Appl. No. 15/205,700.
USPTO; Final Office Action dated Apr. 25, 2018 in U.S. Appl. No. 15/233,946.
USPTO; Final Office Action dated Apr. 26, 2018 in U.S. Appl. No. 15/233,882.
USPTO; Notice of Allowance dated May 11, 2018 in U.S. Appl. No. 14/689,879.
USPTO; Final Office Action dated May 17, 2018 in U.S. Appl. No. 15/234,490.
USPTO; Non-Final Office Action dated May 18, 2018 in U.S. Appl. No. 14/745,845.
USPTO; Non-Final Office Action dated May 24, 2018 in U.S. Appl. No. 15/332,163.
USPTO; Non-Final Office Action dated May 30, 2018 in U.S. Appl. No. 15/371,086.
USPTO; Office Action dated Aug. 22, 2017 in U.S. Appl. No. 15/194,544.
USPTO; Office Action dated Aug. 18, 2017 in U.S. Appl. No. 14/745,845.
USPTO; Notice of Allowance dated Aug. 31, 2017 in U.S. Appl. No. 14/959,653.
USPTO; Office Action dated Sep. 1, 2017 in U.S. Appl. No. 14/689,879.
USPTO; Notice of Allowance dated Sep. 26, 2017 in U.S. Appl. No. 14/811,655.

(56) References Cited

OTHER PUBLICATIONS

USPTO; Final Office Action dated Sep. 26, 2017 in U.S. Appl. No. 14/959,811.
USPTO; Notice of Allowance dated Sep. 29, 2017 in U.S. Appl. No. 15/194,544.
USPTO; Non-Final Office Action dated Oct. 4, 2017 in U.S. Appl. No. 12/853,238.
USPTO; Non-Final Office Action dated Oct. 13, 2017 in U.S. Appl. No. 15/205,700.
USPTO; Non-Final Office Action dated Oct. 18, 2017 in U.S. Appl. No. 15/205,878.
USPTO; Notice of Allowance dated Oct. 20, 2017 in U.S. Appl. No. 13/800,460.
USPTO; Non-Final Office Action dated Nov. 1, 2017 in U.S. Appl. No. 15/209,660.
USPTO; Notice of Allowance dated Nov. 13, 2017 in U.S. Appl. No. 14/959,811.
USPTO; Non-Final Office Action dated Nov. 14, 2017 in U.S. Appl. No. 15/233,882.
USPTO; Notice of Allowance dated Nov. 16, 2017 in U.S. Appl. No. 15/194,544.
USPTO; Non-Final Office Action dated Nov. 16, 2017 in U.S. Appl. No. 15/233,946.
USPTO; Notice of Allowance dated Nov. 17, 2017 in U.S. Appl. No. 13/800,460.
USPTO; Non-Final Office Action dated Nov. 17, 2017 in U.S. Appl. No. 13/841,938.
USPTO; Non-Final Office Action dated Nov. 20, 2017 in U.S. Appl. No. 14/791,166.
USPTO; Non-Final Office Action dated Dec. 4, 2017 in U.S. Appl. No. 15/234,490.
USPTO; Final Office Action dated Nov. 30, 2018 in U.S. Appl. No. 14/745,845.
USPTO; Final Office Action dated Nov. 30, 2018 in U.S. Appl. No. 15/371,086.
USPTO; Final Office Action dated Dec. 4, 2018 in U.S. Appl. No. 15/619,289.
USPTO; Notice of Allowance dated Dec. 13, 2018 in U.S. Appl. No. 15/406,515.
USPTO; Notice of Allowance dated Jan. 3, 2019 in U.S. Appl. No. 15/431,596.
USPTO; Notice of Allowance dated Jan. 8, 2019 in U.S. Appl. No. 15/339,624.
USPTO; Notice of Allowance dated Jan. 18, 2019 in U.S. Appl. No. 15/234,490.
USPTO; Non-Final Office Action dated Jan. 23, 2019 in U.S. Appl. No. 16/144,873.
USPTO; Notice of Allowance dated Jan. 28, 2019 in U.S. Appl. No. 16/030,547.
USPTO; Notice of Allowance dated Feb. 12, 2019 in U.S. Appl. No. 15/332,163.
USPTO; Notice of Allowance dated Feb. 21, 2019 in U.S. Appl. No. 15/902,444.
USPTO; Final Office Action dated Feb. 25, 2019 in U.S. Appl. No. 12/853,238.
USPTO; Non-Final Office Action dated Feb. 27, 2019 in U.S. Appl. No. 15/013,879.
USPTO; Ex Parte Quayle Action dated Nov. 7, 2018 in U.S. Appl. No. 15/332,163.
USPTO; Non-Final Office Action date Nov. 7, 2018 in U.S. Appl. No. 15/205,700.
USPTO; Notice of Allowance dated Nov. 9, 2018 in U.S. Appl. No. 15/431,596.
USPTO; Non-Final Office Action dated Sep. 20, 2018 in U.S. Appl. No. 15/804,903.
USPTO; Notice of Allowance dated Sep. 25, 2018 in U.S. Appl. No. 14/791,166.
USPTO; Non-Final Office Action dated Oct. 5, 2018 in U.S. Appl. No. 16/030,547.
USPTO; Notice of Allowance dated Oct. 12, 2018 in U.S. Appl. No. 14/791,166.
USPTO; Notice of Allowance dated Mar. 4, 2019 in U.S. Appl. No. 15/205,700.
USPTO; Notice of Allowance dated Mar. 13, 2019 in U.S. Appl. No. 14/745,845.
USPTO; Notice of Allowance dated Mar. 13, 2019 in U.S. Appl. No. 15/902,444.
USPTO; Notice of Allowance dated Mar. 15, 2019 in U.S. Appl. No. 16/030,547.
USPTO; Notice of Allowance dated Mar. 18, 2019 in U.S. Appl. No. 15/205,700.
USPTO; Notice of Allowance dated Mar. 19, 2019 in U.S. Appl. No. 15/332,163.
USPTO; Notice of Allowance dated Mar. 20, 2019 in U.S. Appl. No. 15/234,490.
USPTO; Notice of Allowance dated Mar. 21, 2019 in U.S. Appl. No. 12/853,238.
USPTO; Notice of Allowance dated Apr. 5, 2019 in U.S. Appl. No. 15/902,444.
USPTO; Notice of Allowance dated Apr. 23, 2019 in U.S. Appl. No. 15/234,490.
USPTO; Notice of Allowance dated Apr. 18, 2019 in U.S. Appl. No. 15/205,700.
USPTO; Notice of Allowance dated Apr. 19, 2019 in U.S. Appl. No. 15/332,163.
USPTO; Office Action dated Jun. 12, 2019 in U.S. Appl. No. 15/371,086.
USPTO; Office Action dated Jun. 13, 2019 in U.S. Appl. No. 15/804,903.
USPTO; Office Action dated Jun. 27, 2019 in U.S. Appl. No. 15/849,479.
USPTO; Office Action dated Aug. 2, 2019 in U.S. Appl. No. 16/415,271.

\* cited by examiner

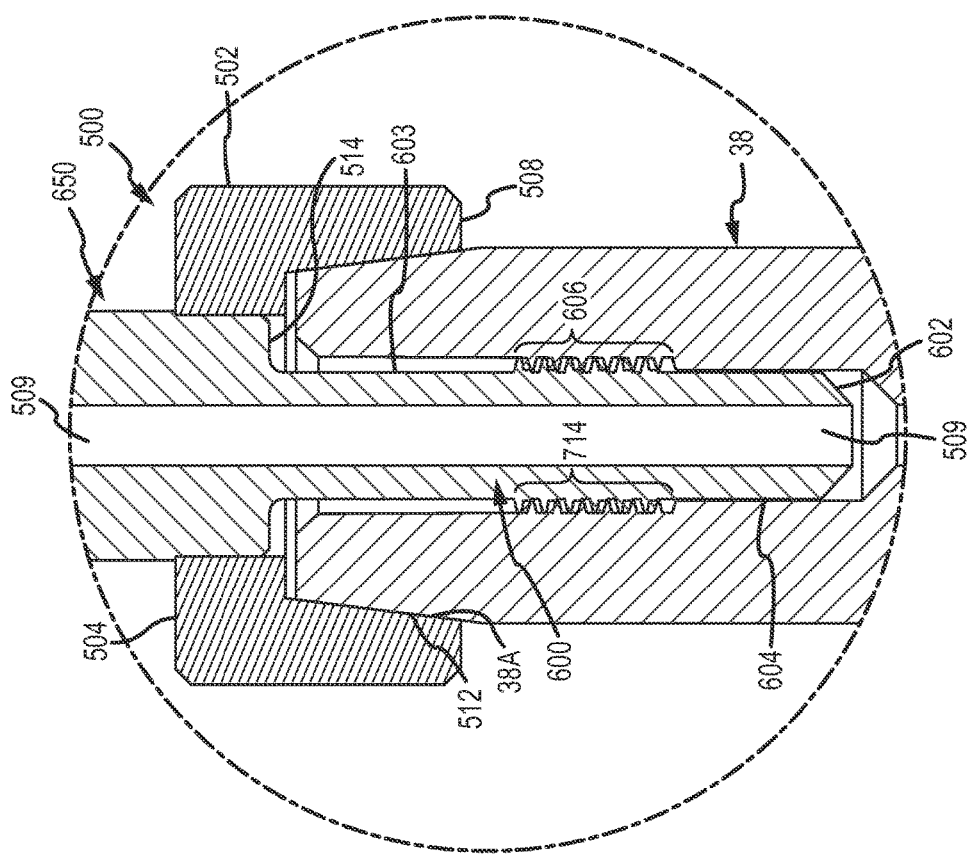
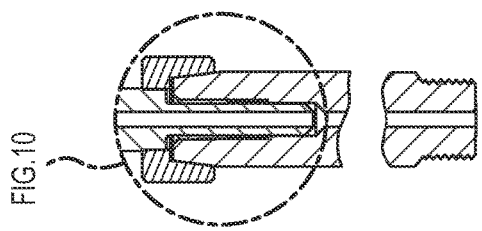
FIG. 10
FIG. 9

COUPLING AND ROTOR SHAFT FOR MOLTEN METAL DEVICES

CROSS REFERENCE TO RELATED APPLICATION

This application is a non-provisional of and claims priority to U.S. Provisional Application Ser. No. 62/020,332 entitled "Coupling and Rotor Shaft for Molten Metal Devices, filed on Jul. 2, 2014, the contents of which are incorporated herein in its entirety for all purposes.

FIELD OF THE INVENTION

The invention relates to couplings and rotor shafts that may be used in various devices, such as pumps, degassers and scrap melters used in molten metal.

BACKGROUND OF THE INVENTION

As used herein, the term "molten metal" means any metal or combination of metals in liquid form, such as aluminum, copper, iron, zinc and alloys thereof. The term "gas" means any gas or combination of gases, including argon, nitrogen, chlorine, fluorine, freon, and helium, that are released into molten metal.

Known molten-metal pumps include a pump base (also called a housing or casing), one or more inlets (an inlet being an opening in the housing to allow molten metal to enter a pump chamber), a pump chamber, which is an open area formed within the housing, and a discharge, which is a channel or conduit of any structure or type communicating with the pump chamber (in an axial pump the chamber and discharge may be the same structure or different areas of the same structure) leading from the pump chamber to an outlet, which is an opening formed in the exterior of the housing through which molten metal exits the casing. An impeller, also called a rotor, is mounted in the pump chamber and is connected to a drive system. The drive system is typically an impeller shaft connected to one end of a drive shaft, the other end of the drive shaft being connected to a motor. Often, the impeller shaft is comprised of graphite, the motor shaft is comprised of steel, and the two are connected by a coupling. As the motor turns the drive shaft, the drive shaft turns the impeller and the impeller pushes molten metal out of the pump chamber, through the discharge, out of the outlet and into the molten metal bath. Most molten metal pumps are gravity fed, wherein gravity forces molten metal through the inlet and into the pump chamber as the impeller pushes molten metal out of the pump chamber.

This application incorporates by reference the portions of the following publications that are not inconsistent with this disclosure: U.S. Pat. No. 4,598,899, issued Jul. 8, 1986, to Paul V. Cooper, U.S. Pat. No. 5,203,681, issued Apr. 20, 1993, to Paul V. Cooper, U.S. Pat. No. 5,308,045, issued May 3, 1994, by Paul V. Cooper, U.S. Pat. No. 5,662,725, issued Sep. 2, 1997, by Paul V. Cooper, U.S. Pat. No. 5,678,807, issued Oct. 21, 1997, by Paul V. Cooper, U.S. Pat. No. 6,027,685, issued Feb. 22, 2000, by Paul V. Cooper, U.S. Pat. No. 6,123,523, issued Sep. 26, 2000, by Paul V. Cooper, U.S. Pat. No. 6,303,074, issued Oct. 16, 2001, by Paul V. Cooper, U.S. Pat. No. 6,689,310, issued Feb. 10, 2004, by Paul V. Cooper, U.S. Pat. No. 6,723,276, issued Apr. 20, 2004, by Paul V. Cooper, U.S. Pat. No. 7,402,276, issued Jul. 22, 2008, by Paul V. Cooper, U.S. Pat. No. 7,507,367, issued Mar. 24, 2009, by Paul V. Cooper, U.S. Pat. No. 7,906,068, issued Mar. 15, 2011, by Paul V. Cooper, U.S. Pat. No. 8,075,837, issued Dec. 13, 2011, by Paul V. Cooper, U.S. Pat. No. 8,110,141, issued Feb. 7, 2012, by Paul V. Cooper, U.S. Pat. No. 8,178,037, issued May 15, 2012, by Paul V. Cooper, U.S. Pat. No. 8,361,379, issued Jan. 29, 2013, by Paul V. Cooper, U.S. Pat. No. 8,366,993, issued Feb. 5, 2013, by Paul V. Cooper, U.S. Pat. No. 8,409,495, issued Apr. 2, 2013, by Paul V. Cooper, U.S. Pat. No. 8,440,135, issued May 15, 2013, by Paul V. Cooper, U.S. Pat. No. 8,444,911, issued May 21, 2013, by Paul V. Cooper, U.S. Pat. No. 8,475,708, issued Jul. 2, 2013, by Paul V. Cooper, U.S. patent application Ser. No. 12/895,796, filed Sep. 30, 2010, by Paul V. Cooper, U.S. patent application Ser. No. 12/877,988, filed Sep. 8, 2010, by Paul V. Cooper, U.S. patent application Ser. No. 12/853,238, filed Aug. 9, 2010, by Paul V. Cooper, U.S. patent application Ser. No. 12/880,027, filed Sep. 10, 2010, by Paul V. Cooper, U.S. patent application Ser. No. 13/752,312, filed Jan. 28, 2013, by Paul V. Cooper, U.S. patent application Ser. No. 13/756,468, filed Jan. 31, 2013, by Paul V. Cooper, U.S. patent application Ser. No. 13/791,889, filed Mar. 8, 2013, by Paul V. Cooper, U.S. patent application Ser. No. 13/791,952, filed Mar. 9, 2013, by Paul V. Cooper, U.S. patent application Ser. No. 13/841,594, filed Mar. 15, 2013, by Paul V. Cooper, and U.S. patent application Ser. No. 14/027,237, filed Sep. 15, 2013, by Paul V. Cooper.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Most often, circulation pumps are used in a reverbatory furnace having an external well. The well is usually an extension of the charging well where scrap metal is charged (i.e., added).

Transfer pumps are generally used to transfer molten metal from the one structure to another structure such as a ladle or another furnace.

Gas-release pumps, such as gas-injection pumps, circulate molten metal while introducing a gas into the molten metal. In the purification of molten metals, particularly aluminum, it is frequently desired to remove dissolved gases such as hydrogen, or dissolved metals, such as magnesium. As is known by those skilled in the art, the removing of dissolved gas is known as "degassing" while the removal of magnesium is known as "demagging." Gas-release pumps may be used for either of these purposes or for any other application for which it is desirable to introduce gas into molten metal.

Gas-release pumps generally include a gas-transfer conduit having a first end that is connected to a gas source and a second end submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where molten metal enters the pump chamber.

Molten metal pump casings and rotors often employ a bearing system comprising ceramic rings wherein there are one or more rings on the rotor that align with rings in the pump chamber (such as rings at the inlet and outlet) when the rotor is placed in the pump chamber. The purpose of the bearing system is to reduce damage to the soft, graphite components, particularly the rotor and pump base, during pump operation.

Generally, a degasser (also called a rotary degasser) includes (1) an impeller shaft having a first end, a second end and a passage for transferring gas, (2) an impeller, and (3) a drive source for rotating the impeller shaft and the impeller. The first end of the impeller shaft is connected to the drive source and to a gas source and the second end is connected to the connector of the impeller.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

Generally a scrap melter includes an impeller affixed to an end of a drive shaft, and a drive source attached to the other end of the drive shaft for rotating the shaft and the impeller. The movement of the impeller draws molten metal and scrap metal downward into the molten metal bath in order to melt the scrap. A circulation pump is preferably used in conjunction with the scrap melter to circulate the molten metal in order to maintain a relatively constant temperature within the molten metal.

Numerous rotor shaft to motor shaft couplings are known. A problem with the couplings, however, is that by applying driving force to the rotor shaft the rotor shaft tends to break at the location where the force is being applied. This is typically at the location where the coupling and rotor shaft are in contact, and the broken end of the rotor shaft must often be chiseled out of an opening in the coupling in which it is retained.

SUMMARY OF THE INVENTION

The present invention helps to alleviate the afore-mentioned problems by providing a coupling and rotor shaft for use in a molten metal pump, a molten metal rotary degasser or a molten metal scrap melter. The coupling has a collar with a cavity open at the bottom and a protrusion extending out of the cavity. The protrusion is preferably threaded along at least part of its length, wherein the threaded portion(s) are preferably outside of the cavity.

The rotor shaft preferably has a bore that receives the protrusion. Preferably the bore has internal threads that align with and receive the threads on the protrusion. Most preferably, there are no threads on the inner surface of the coupling opening or the outer surface of the rotor shaft.

With such a structure, if the rotor shaft breaks, it tends to break where the threads of the rotor shaft bore align with the threads of the protrusion, which is below the opening in the coupling. As a consequence, the broken piece of rotor shaft can either be unthreaded or chiseled off of the protrusion, each of which is simpler than chiseling a broken end out of the coupling opening.

The protrusion may have an internal passage for transferring gas therethrough and the rotor shaft passage may extend to the second end (or almost to the second end) to permit gas to be transferred therethrough.

BRIEF DESCRIPTION OF THE DRAWING

FIG. 9 is a partial, cross-sectional side view of a rotor/coupling connection in accordance with aspects of the invention.

FIG. 10 is a close-up view of Section G of FIG. 9.

DETAILED DESCRIPTION OF PREFERRED EMBODIMENTS

For any device described herein, any of the components that contact the molten metal are preferably formed by a material that can withstand the molten metal environment. Preferred materials are oxidation-resistant graphite and ceramics, such as silicon carbide. Oxidation-resistant graphite is most preferred because of its relatively low cost and ease of manufacturing.

Figure 1:
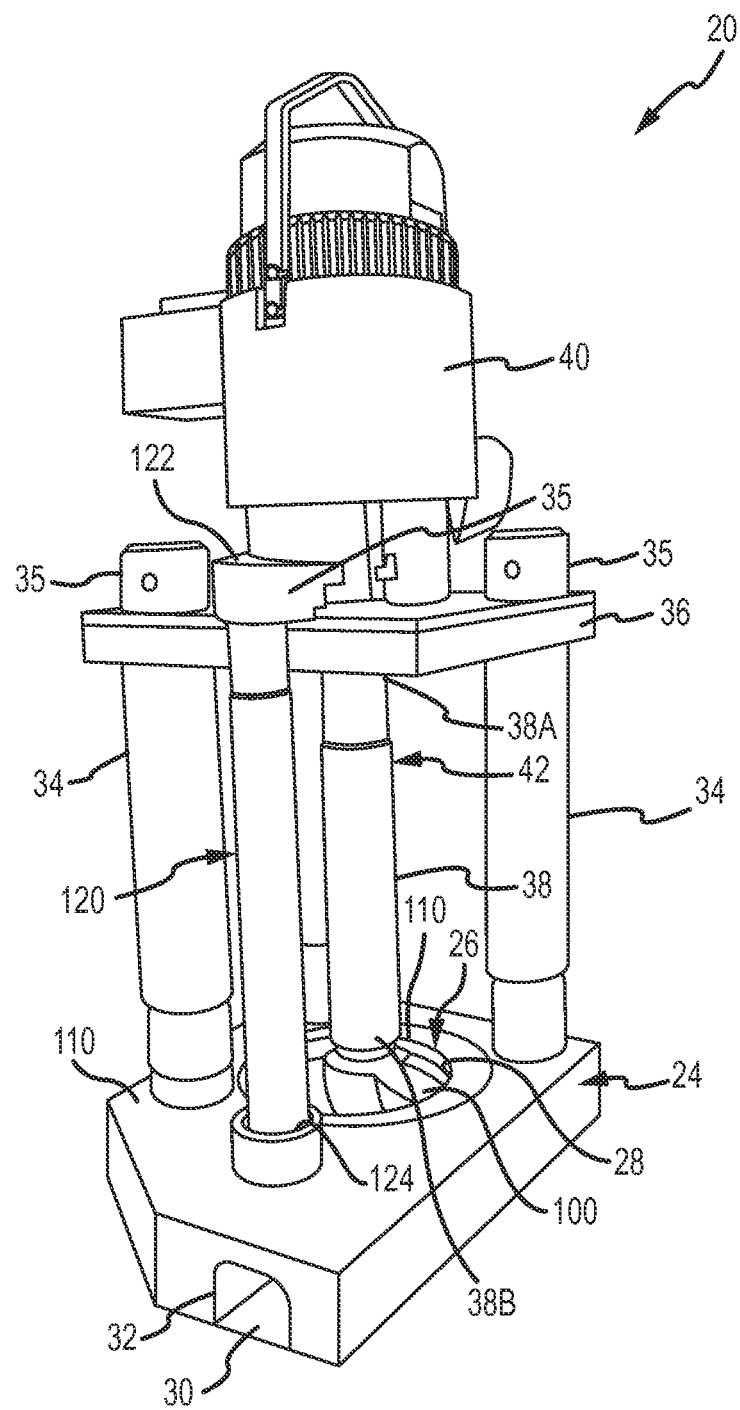
FIG. 1 is a perspective view of a pump for pumping molten metal, which may include a coupling and rotor shaft according to aspects of the invention.

Referring now to the drawing where the purpose is to illustrate and describe different embodiments of the invention, and not to limit same, FIG. 1 shows a molten metal pump 20 in accordance with an aspect of the present invention. Pump 20 is designed for operation in any environment in which molten metal is to be pumped or otherwise conveyed. Pump 20 can be any structure or device for pumping or otherwise conveying molten metal, such as the tangential-discharge pump disclosed in U.S. Pat. No. 5,203,681 to Cooper, or an axial pump having an axial, rather than tangential, discharge. Pump 20 has a pump base 24 submersible in a molten metal bath B. In this embodiment, pump base 24 includes a generally nonvolute pump chamber 26, such as a cylindrical pump chamber or what has been called a "cut" volute although pump base 24 may have any shape pump chamber suitable of being used, such as a volute-shaped chamber. Chamber 26 may have only one opening, in either its top or bottom, since only one opening is required to introduce molten metal into pump chamber 26, although chamber 26 may have an opening in both its top and bottom. Generally, pump chamber 24 has two coaxial openings of the same diameter and usually one is blocked by a flow blocking plate mounted on the bottom of, or formed as part of, rotor 100. Base 24 further includes a tangential discharge 30 (although another type of discharge, such as an axial discharge, may be used) in fluid communication with chamber 26.

The invention is not limited to any particular type or configuration of pump base, or of even having a base. A pump, rotary degasser or scrap melter used with the invention could be of any size, design or configuration suitable for utilizing a rotor shaft and coupling according to the invention.

In the embodiment shown, one or more support posts 34 connect base 24 to a superstructure 36 of pump 20 thus supporting superstructure 36, although any structure or structures capable of supporting superstructure 36 may be used. Additionally, pump 20 could be constructed so there is no physical connection between the base and the superstructure, wherein the superstructure is independently supported, and/or there is no base. The motor, drive shaft and rotor could be suspended without a superstructure, wherein they are supported, directly or indirectly, to a structure independent of a pump base.

A motor 40, which can be any structure, system or device suitable for driving pump 20, but is preferably an electric, hydraulic or pneumatic motor, is positioned on superstructure 36 and is connected to a drive shaft 42. Drive shaft 42 can be any structure suitable for rotating the impeller 100, and preferably comprises a motor shaft (not shown) that connects to rotor shaft 44' via a coupling 500, which is described further below.

A rotor, also called an impeller, 100 is positioned at least partially within pump chamber 26. Preferred rotor 100 is preferably imperforate, and any type or shape of impeller suitable for use in a molten metal pump, rotary degasser or scrap melter, respectively, may be used to practice aspects of the invention. Rotor 100 has a connecting portion 110 to connect to a second end 44B' of rotor drive shaft 44'.

Figure 2:
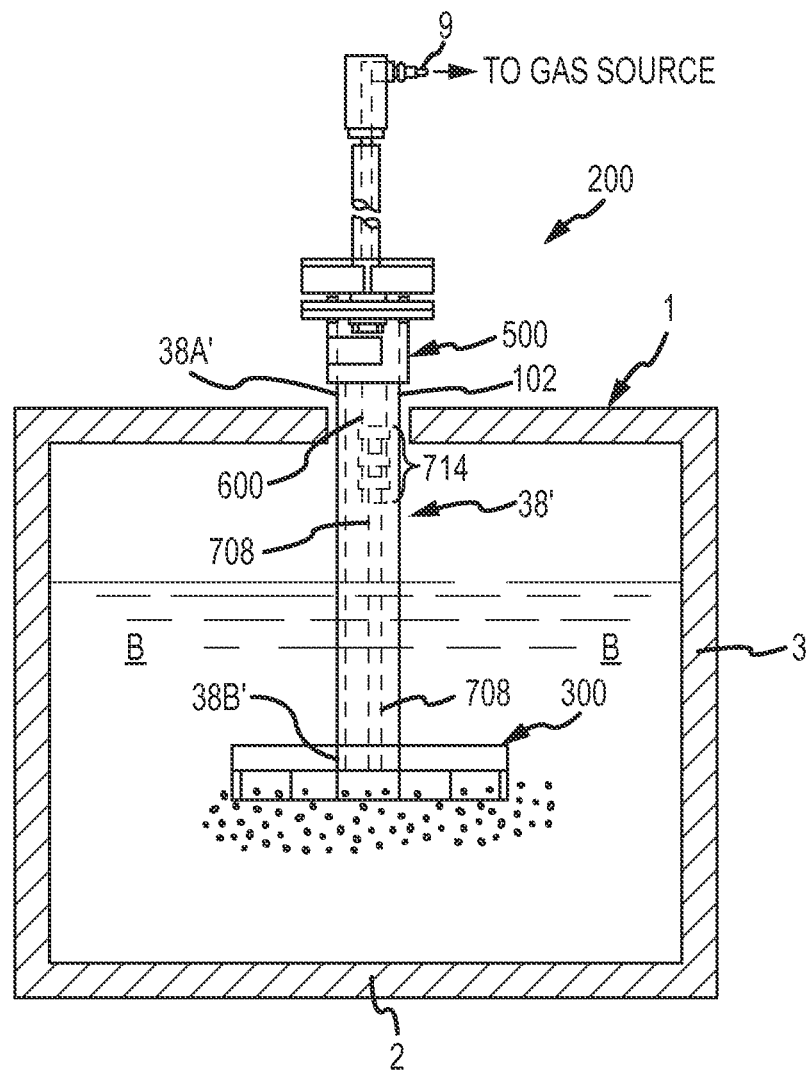
FIG. 2 shows a rotary degasser, which may include a coupling and rotor shaft according to aspects of the invention.

FIG. 2 shows a preferred gas-release device 200 according to the invention. Device 200 is designed to operate in a molten metal bath B contained within a vessel 1. Device 200 is preferably a rotary degasser and includes a rotor shaft 44, an impeller 300 and a drive source (not shown). Device 200 preferably also includes a coupling 500.

Figure 3:
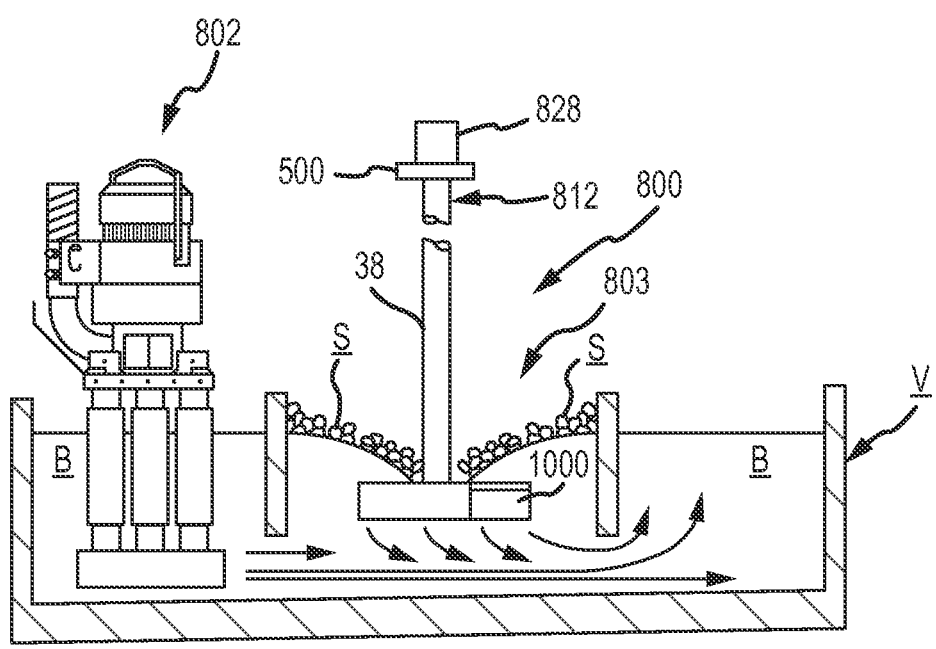
FIG. 3 shows a scrap melter, which may include a coupling and rotor shaft according to aspects of the invention.

FIG. 3 shows a scrap melter utilizing a coupling 500 and rotor drive shaft 44' in accordance with aspects of the invention.

Figure 4:
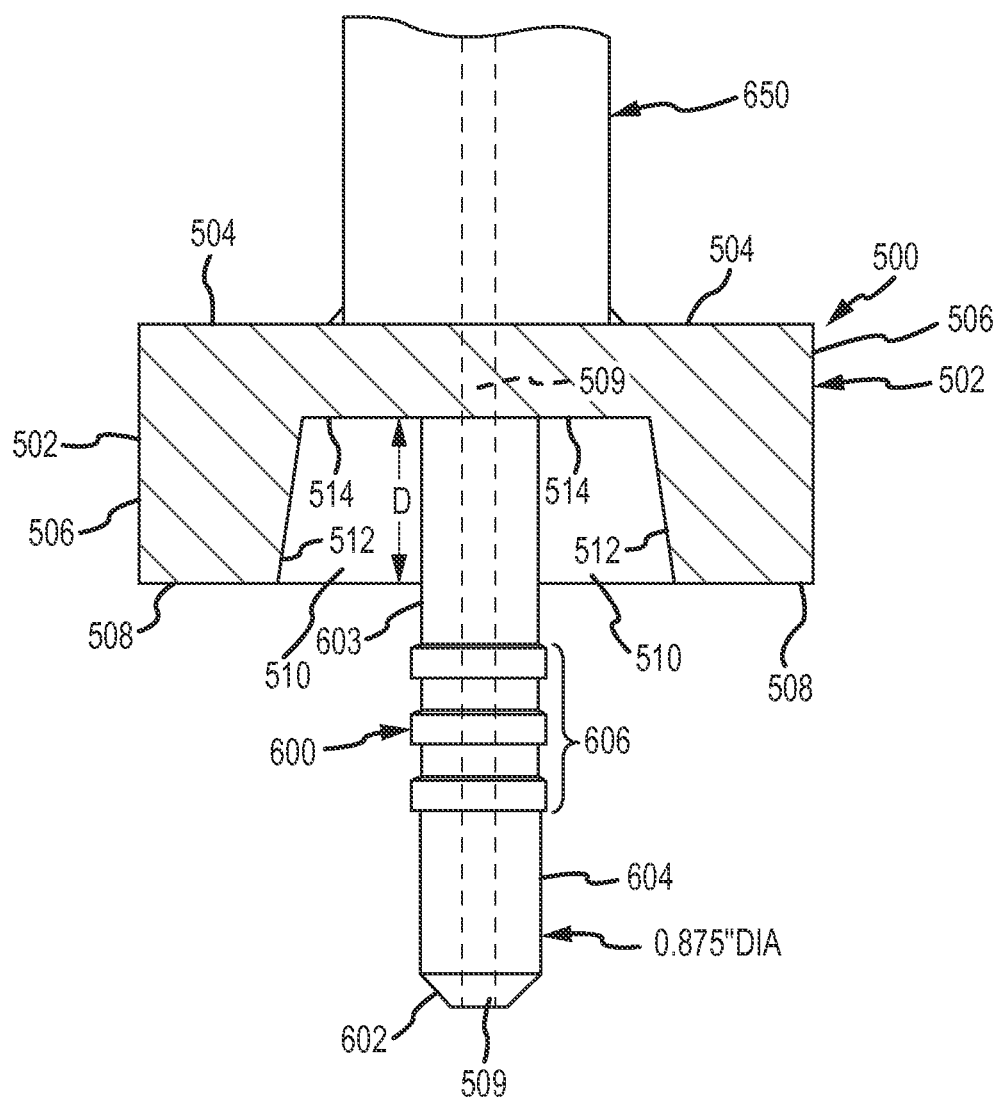
FIG. 4 is a side, cross-sectional view of a coupling that can be used in accordance with aspects of the invention.

Turning to FIG. 4, coupling 500 includes a collar 502, which as shown is circular with a flat top 504, an annular outer side wall 506, and a bottom edge 508. Two slots 505 are preferably formed on either side of collar 502 so collar 502 may be easily gripped and turned by a wrench. A passage 509 may be formed in collar 502 to permit gas to transfer therethrough. A cavity 510 is formed within coupling 500 in order to receive a first end 38A of rotor shaft 38, described further below. In one embodiment the coupling 500 is made of steel, has a height of about 2.5"-3" and an overall width of about 4½"-5½". Cavity 510 has a depth D of about 1-1½", and most preferably about 1¼", a diameter of about 3" next to bottom edge 508, and an inner wall 512 that slopes inward at between 5° and 10°, and most preferably about 7°, until it terminates at upper cavity wall 514. Inner wall 512 preferably is not threaded.

A projection 600 extends downward from upper cavity wall 514, through cavity 510 and projects outward therefrom. Projection 600 may be connected to collar 502 in any suitable manner, such as being threadingly received in an opening (not shown) or welded to collar 502. In one embodiment, projection 600 is between 0.800 and 1.000 inches in diameter, and preferably about 0.875" in diameter and extends outward from the bottom of cavity 510 (defined by where cavity 510 aligns with bottom edge 508) by between 2½"-3¾", and preferably 3¼". At the bottom end of projection 600 is preferably a chamfered end 602, that in the embodiment shown is ¼" long with a 45° chamfer. Projection 600 has an outer surface 604 with threads 606 that are preferably positioned outside of cavity 510. An upper portion 605 of projection 600 is positioned in cavity 510. As shown, the threads 606 preferably begin at a position about ½" beneath the lower portion of cavity 510, extend for about 1¼", and are 1" ACME threads, although any suitable length and type of thread may be used. Projection 600 may have an internal passage 509 therein for the passage of gas.

Coupling 500 may also include one extended metal portion 650 above coupling Section 502. The extended length of portion 650 reduces the cost of new and replacement rotor shafts (because they are shorter) and portion 650 is preferably between 4.5" and 12" in length. A top plate 660 mates with a known structure, such as a motor shaft with a rotary union, for driving the coupling 500 and injecting gas into it. Apertures 662 permit fasteners (not shown) to pass through and connect to a suitable driving structure, which is known in the art.

Figure 5:
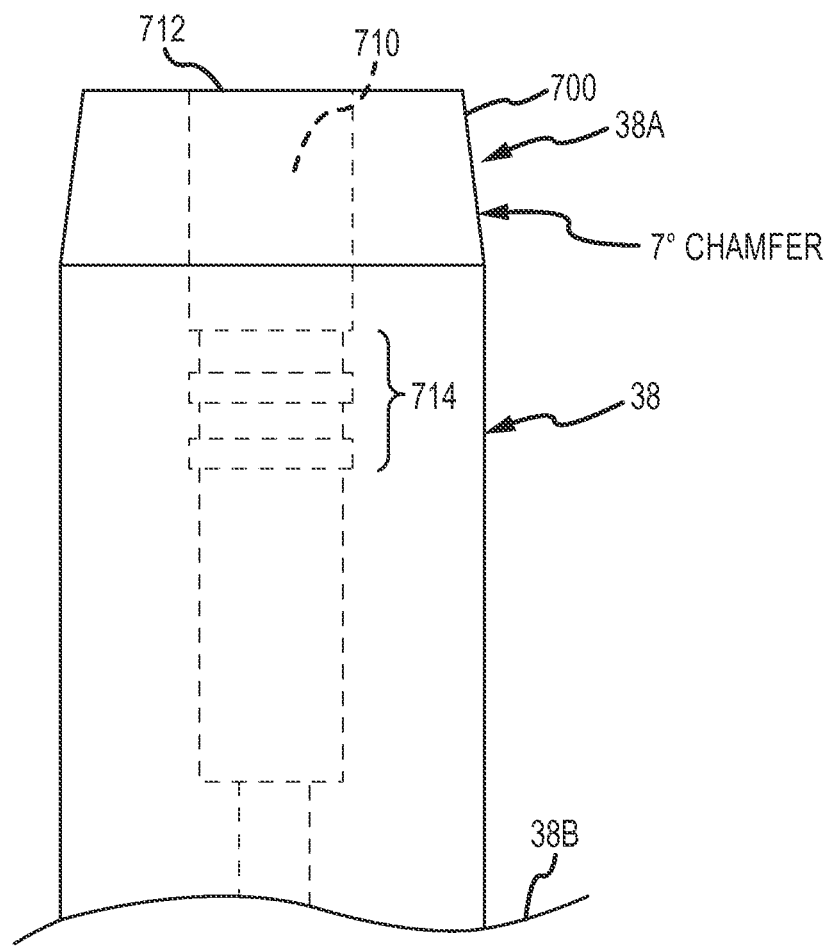
FIG. 5 is a partial side view of a rotor shaft that may be used according to aspects of the invention.
Figure 6:
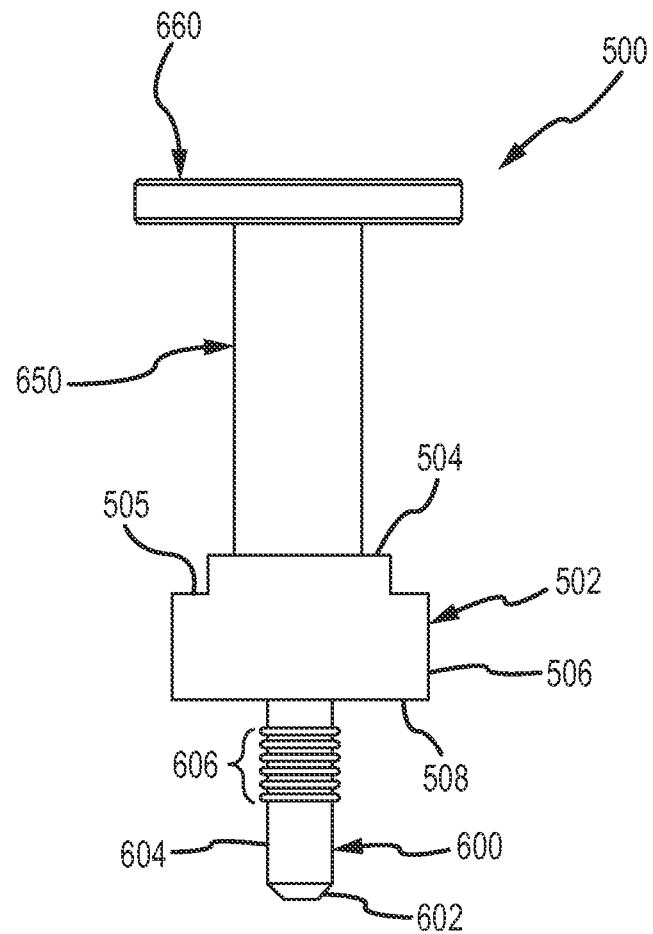
FIG. 6 is a side view of a coupling that may be used in accordance with aspects of the invention.
Figure 7:
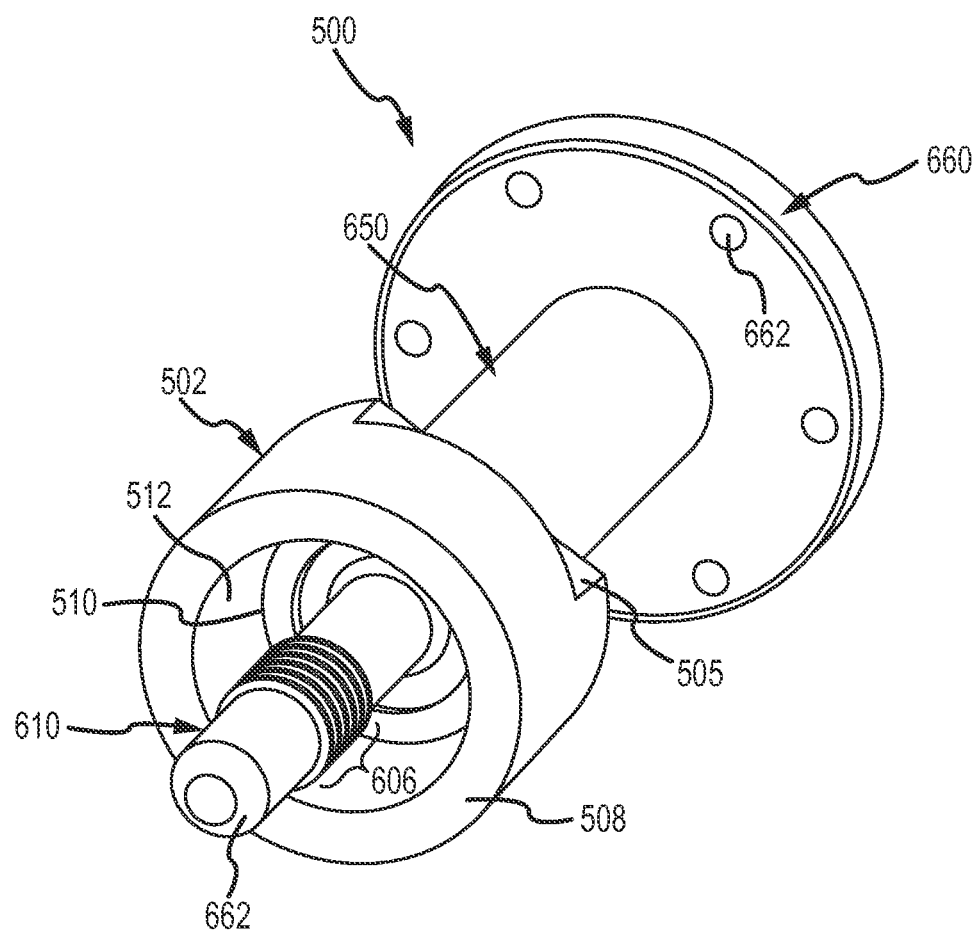
FIG. 7 is a side, perspective view of a coupling that may be used in accordance with aspects of the invention.
Figure 8:
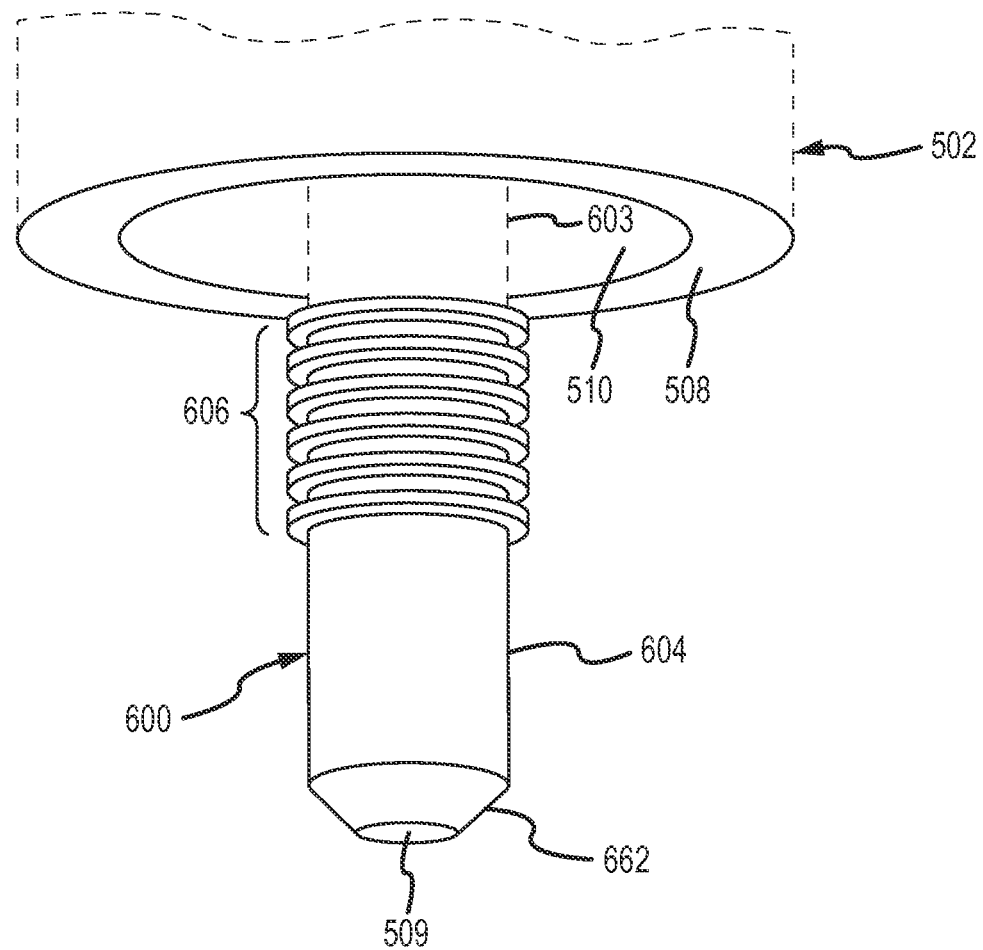
FIG. 8 is a partial side view of the lower portion of the coupling shown in in FIGS. 6 and 7.

As is illustrated in FIGS. 2 and 5, rotor shaft 38 has a first end 38A, a second end 38B, an outer surface 706 (that is preferably annular) and an inner passage 708 (which is optional depending upon the application) for transferring gas. Second end 38B preferably has a structure, such as a threaded end, for connecting to an impeller, although any suitable connection may be used. Shaft 38 may be a unitary structure or may be a plurality of pieces connected together.

First end 38A is dimensioned to receive projection 600 and to fit into cavity 510. First end 38A as shown has a chamfered end 700 that is received in cavity 510 so that top surface 708 is against surface 514 when the rotor shaft 44 and coupling 500 are assembled. First end 38A also has an opening 712 leading to inner passage 708, which includes threads 714 that threadingly engage threads 606. In this embodiment, inner passage 708 extends through, or essentially through, rotor shaft 38 to transfer gas to second end 38B so that gas may be released into molten metal in any suitable manner.

Rotor shaft 38 is connected to coupling 500 by aligning projection 600 with opening 712 and pushing projection into passage 708 until threads 606 meet threads 714, and then screwing rotor shaft 38 onto projection 600. Most preferably the respective threaded portions 606 and 714 are tightened in the same direction as the rotor shaft rotates during operation so that they do not loosen during operation.

Having thus described different embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:

1. A molten metal pump comprising:
   (a) a motor having a motor shaft connected thereto, the motor shaft having a first end connected to the motor and a second end having a plurality of fastener apertures therein;
   (b) a coupling comprising a cylindrical outer surface and having a first end having a plurality of fastener holes extending therethrough aligned with the apertures in the motor shaft for receiving fasteners therein, and a second end of the coupling comprising:
      (i) a collar having an annular inner sidewall defining a cavity therein concentric with the cylindrical outer surface and having an opening configured to receive an end of a rotor shaft, the cavity defining a top surface at an enclosed end of the cavity; and (ii) a partially threaded cylindrical projection axially protruding through the center of the opening and axially extending outside of the opening, the projection being threaded only outside of the opening such that there are no threads axially within the cavity; and (c) a rotor shaft having (i) a first end positioned at least partly in the cavity of the collar, the first end comprising a bore having a threaded portion that is threadingly connected to the projection outside of the opening to facilitate unthreading of the rotor shaft, and (ii) a second end having a rotor connected thereto.

2. The pump of claim 1, wherein the collar and the projection are comprised of steel.

3. The pump of claim 1, wherein the cavity in the collar is chamfered so that it has a smaller diameter at the top surface than at the opening.

4. The pump of claim 1, wherein the projection protrudes 2" or more from the opening.

5. The pump of claim 1, wherein the projection protrudes 3" or more from the opening.

6. The pump of claim 1, wherein the projection has a first portion configured to be positioned inside of the cavity and a second portion configured to be positioned outside of the opening, the first portion not having any threads.

7. The pump of claim 6, wherein the second portion of the projection has a length, an upper portion and a lower portion, and the lower portion comprises at least ⅓ of the length and having no threads.

8. The pump of claim 1, wherein the threads are square, 1" ACME threads.

9. The pump of claim 1, wherein the projection has an exterior end and the exterior end is chamfered.

10. The pump of claim 9, wherein the exterior end is ¼" long and has a 45° chamfer.

11. The pump of claim 1, wherein the distance from the top surface to the opening is between 1" and 1.5".

12. The pump of claim 1, wherein the projection includes an interior passage for transferring gas.

13. A rotary degasser comprising:
(a) a motor having a motor shaft connected thereto, the motor shaft having a first end connected to the motor and a second end having a plurality of fastener apertures therein;
(b) a coupling comprising a cylindrical outer surface and having a first end having a plurality of fastener holes extending therethrough aligned with the apertures in the motor shaft for receiving fasteners therein, and a second end of the coupling comprising:
(i) a collar having an annular inner sidewall defining a cavity therein concentric with the cylindrical outer surface and having an opening configured to receive an end of a rotor shaft, the cavity defining a top surface at an enclosed end of the cavity; and
(ii) a partially threaded cylindrical projection axially protruding through the center of the opening and axially extending outside of the opening, the projection being threaded only outside of the opening such that there are no threads axially within the cavity; and
(c) a rotor shaft having (i) a first end positioned at least partly in the cavity of the collar, the first end comprising a bore having a threaded portion that is threadingly connected to the projection outside of the opening to facilitate unthreading of the rotor shaft, and (ii) a second end having a rotor connected thereto.

14. The degasser of claim 13, wherein the collar and the projection are comprised of steel.

15. The degasser of claim 13, wherein the cavity in the collar is chamfered so that it has a smaller diameter at the top surface than at the opening.

16. The degasser of claim 13, wherein the projection protrudes 2" or more from the opening.

17. The degasser of claim 13, wherein the projection protrudes 3" or more from the opening.

18. The degasser of claim 13, wherein the projection has a first portion configured to be positioned inside of the cavity and a second portion configured to be positioned outside of the opening, the first portion not having any threads.

19. The degasser of claim 18, wherein the second portion of the projection has a length, an upper portion and a lower portion, and the lower portion comprises at least ⅓ of the length and having no threads.

20. The degasser of claim 13, wherein the threads are square, 1" ACME threads.

21. The degasser of claim 13, wherein the projection has an exterior end and the exterior end is chamfered.

22. The degasser of claim 20, wherein the exterior end is ¼" long and has a 45° chamfer.

23. The degasser of claim 13, wherein the distance from the top surface to the opening is between 1" and 1.5".

24. The degasser of claim 13, wherein the projection includes an interior passage for transferring gas.

* * * * *